(12) United States Patent
Park

(10) Patent No.: US 11,134,105 B2
(45) Date of Patent: Sep. 28, 2021

(54) METHOD AND APPARATUS FOR PROVIDING A PROFILE

(71) Applicant: Samsung Electronics Co., Ltd., Suwon-si (KR)

(72) Inventor: Jonghan Park, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/502,645

(22) Filed: Jul. 3, 2019

(65) Prior Publication Data

US 2019/0324735 A1 Oct. 24, 2019

Related U.S. Application Data

(63) Continuation of application No. 15/381,620, filed on Dec. 16, 2016, now Pat. No. 10,346,147.

(Continued)

(30) Foreign Application Priority Data

Dec. 2, 2016 (KR) .......................... 10-2016-0163799

(51) Int. Cl.
*H04L 29/06* (2006.01)
*G06F 8/61* (2018.01)
*H04W 12/06* (2021.01)

(52) U.S. Cl.
CPC ............. *H04L 63/20* (2013.01); *G06F 8/61* (2013.01); *H04L 63/102* (2013.01); *H04W 12/06* (2013.01)

(58) Field of Classification Search
CPC .............................. H04L 63/102; H04L 63/20
See application file for complete search history.

(56) References Cited

U.S. PATENT DOCUMENTS 9,009,475 B2 4/2015 Hauck et al.
2009/0163176 A1* 6/2009 Hasegawa ............. H04L 63/083
455/411

(Continued)

OTHER PUBLICATIONS

GSMA; RSP Architecture; Version 1.0; Dec. 23, 2015; GSM Association; Official Document SGP.21-RSP Architecture.

(Continued)

*Primary Examiner* — Andrew J Steinle
(74) *Attorney, Agent, or Firm* — Jefferson IP Law, LLP

(57) ABSTRACT

A method for downloading a profile by a terminal and the terminal for performing the same are provided. The method includes acquiring information including an access token for transmitting a profile request to a profile server, transmitting a first message including the access token and a universal integrated circuit card (UICC) information of the terminal to the profile server, receiving a second message including a verification result from the profile server, and receiving a profile package corresponding to the access token from the profile server. The present disclosure relates to a communication method and system for converging a $5^{th}$-Generation (5G) communication system for supporting higher data rates beyond a $4^{th}$-Generation (4G) system with a technology for internet of things (IoT). The present disclosure may be applied to intelligent services based on the 5G communication technology and the IoT-related technology.

20 Claims, 22 Drawing Sheets

Related U.S. Application Data

(60) Provisional application No. 62/271,019, filed on Dec. 22, 2015.

(56) References Cited

U.S. PATENT DOCUMENTS

| | | | |
|---|---|---|---|
| 2010/0293593 A1 | 11/2010 | Lindholm et al. | |
| 2011/0131177 A1* | 6/2011 | Sheth | H04L 67/306 707/609 |
| 2011/0287752 A1 | 11/2011 | Sahu et al. | |
| 2012/0190354 A1* | 7/2012 | Merrien | H04L 63/083 455/422.1 |
| 2012/0196569 A1* | 8/2012 | Holtmanns | H04L 63/0428 455/411 |
| 2013/0045686 A1* | 2/2013 | Kang | G06Q 10/10 455/41.2 |
| 2014/0031012 A1 | 1/2014 | Park et al. | |
| 2014/0101734 A1* | 4/2014 | Ronda | H04L 9/3234 726/5 |
| 2014/0329502 A1 | 11/2014 | Lee et al. | |
| 2015/0100788 A1* | 4/2015 | Chastain | H04L 63/0807 713/169 |
| 2015/0237502 A1* | 8/2015 | Schmidt | H04W 12/10 726/7 |
| 2015/0281362 A1* | 10/2015 | Shanmugam | H04L 67/12 709/217 |
| 2016/0105290 A1* | 4/2016 | Khalil | H04L 63/0421 713/176 |
| 2016/0134661 A1 | 5/2016 | Wimbock | |
| 2017/0156051 A1* | 6/2017 | Park | H04W 84/18 |
| 2017/0188226 A1* | 6/2017 | Wu | H04W 8/186 |
| 2017/0295490 A1* | 10/2017 | Jolivet | H04L 63/0876 |
| 2017/0325084 A1* | 11/2017 | Larignon | H04W 60/005 |
| 2018/0054463 A1 | 2/2018 | Chang et al. | |
| 2018/0255451 A1* | 9/2018 | Fan | H04W 12/08 |
| 2018/0351947 A1* | 12/2018 | Cheng | H04L 63/0869 |

OTHER PUBLICATIONS

European Search Report dated Jun. 3, 2020, issued in European Application No. 16 205 285.6.

* cited by examiner

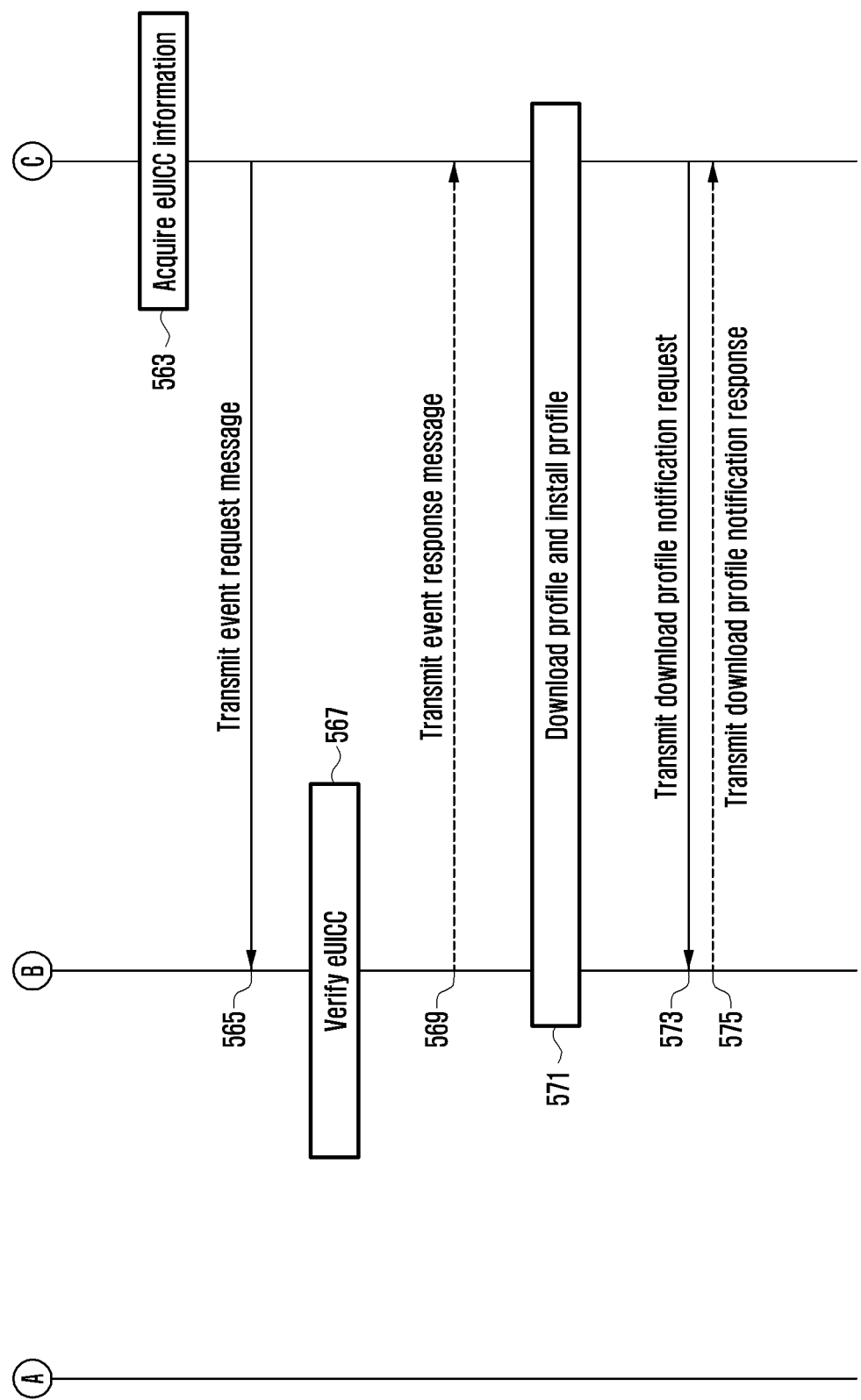

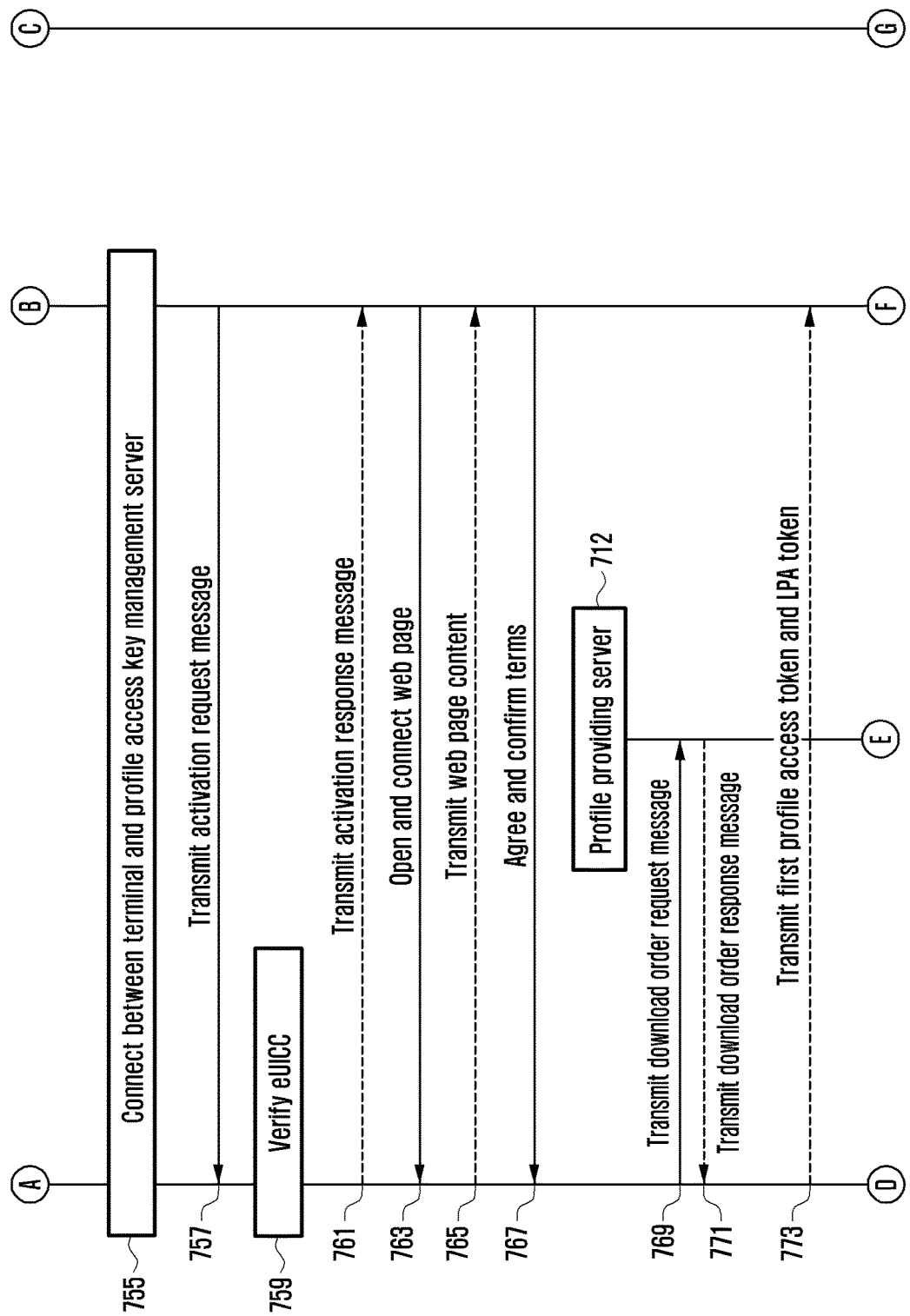

Profile access key [text type]

1$SMDP.GSMA.COM$0123456789ABCDEFGHIJ

Profile access key [QR code type]

QR Code (Version 3, Level M)

METHOD AND APPARATUS FOR PROVIDING A PROFILE

CROSS-REFERENCE TO RELATED APPLICATION(S)

This application is a continuation application of prior application Ser. No. 15/381,620, filed on Dec. 16, 2016, which was based on and claimed priority under 35 U.S.C. § 119(e) of a U.S. Provisional application No. 62/271,019, filed on Dec. 22, 2015 in the U.S. Patent and Trademark Office, and under 35 U.S.C. § 119(a) of a Korean patent application number 10-2016-0163799, filed on Dec. 2, 2016 in the Korean Intellectual Property Office, the disclosure of each of which is incorporated by reference herein in its entirety.

TECHNICAL FIELD

The present disclosure relates to a method and an apparatus for downloading and installing a communication service to and in a terminal in a communication system for a communication connection. More particularly, the present disclosure relates to a method and an apparatus for downloading and installing a profile in real time in a communication system.

BACKGROUND

To meet a demand for radio data traffic that is on an increasing trend since commercialization of a fourth generation (4G) communication system, efforts to develop an improved fifth generation (5G) communication system or a pre-5G communication system have been conducted. For this reason, the 5G communication system or the pre-5G communication system is called a communication system beyond 4G network or a system since the post long term evolution (LTE). To achieve a high data transmission rate, the 5G communication system is considered to be implemented in a super high frequency (mmWave) band (for example, like 60 GHz band). To relieve a path loss of a radio wave and increase a transfer distance of a radio wave in the super high frequency band, in the 5G communication system, beamforming, massive multiple input and multiple output (MIMO), full dimensional MIMO (FD-MIMO), array antenna, analog beam-forming, and large scale antenna technologies have been discussed. Further, to improve a network of the system, in the 5G communication system, technologies such as evolved small cell, advanced small cell, cloud radio access network (cloud RAN), ultra-dense network, device to device communication (D2D), wireless backhaul, moving network, cooperative communication, coordinated multi-points (CoMP), and interference cancellation have been developed. In addition to this, in the 5G system, hybrid FSK and QAM modulation (FQAM) and sliding window superposition coding (SWSC) that are an advanced coding modulation (ACM) scheme and a filter bank multi carrier (FBMC), a non-orthogonal multiple access (NOMA), and a sparse code multiple access (SCMA) which are an advanced access technology, and so on have been developed.

Meanwhile, the internet has evolved to an internet of things (IoT) network that transmits and receives information, such as things, between distributed components and processes the information, in a human-centered connection network through which a human being generates and consumes information. The internet of everything (IoE) technology in which the big data processing technology, etc., by connection with a cloud server, etc., is combined with the IoT technology has also emerged. To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between things has been researched. In the IoT environment, an intelligent internet technology (IT) service that creates a new value in human life by collecting and analyzing data generated in the connected things may be provided. The IoT may be applied to fields, such as a smart home, a smart building, a smart city, a smart car or a connected car, a smart grid, health care, smart appliances, and an advanced healthcare service by fusing and combining the existing information technology (IT) with various industries.

Therefore, various tries to apply the 5G communication system to the IoT network have been conducted. For example, the 5G communication technologies such as the technologies of the sensor network, the machine to machine (M2M), the machine type communication (MTC) are implemented by techniques such as the beam-forming, the MIMO, the array antenna, or the like. An example of the application of the cloud radio access network (cloud RAN) as the big data processing technology described above may also be the fusing of the 5G technology with the IoT technology.

A universal integrated circuit card (UICC) is a smart card inserted into a mobile communication terminal, etc., and is called a UICC card. The UICC may include an access control module for accessing a network of a mobile carrier. An example of the access control module may include a universal subscriber identity module (USIM), a subscriber identity module (SIM), an internet protocol (IP) multimedia service identity module (ISIM), etc. The UICC including the USIM is generally called an USIM card. Similarly, the UICC including an SIM module is generally called an SIM card. In the following description of the present disclosure, the SIM card is used as a general meaning including the UICC, etc. in which the UICC card, the USIM card, and the ISIM are included. That is, the technology of the SIM card may be identically applied to the USIM card, the ISIM card, or even the general UICC card.

The SIM card may store personal information on a mobile communication subscriber and perform subscriber authentication and a generation of a traffic security key upon an access to a mobile communication network, thereby implementing the use of the safe mobile communication.

The SIM card is generally manufactured as a dedicated card for the corresponding mobile carrier by a request of a specific mobile carrier upon manufacturing of a card at this time of the filing of the present disclosure. A card in which authentication information for accessing a network, for example, universal subscriber identity module (USIM) application and international mobile subscriber identity (IMSI), a K value, an object linking and embedding (OLE) for process control (OPc) value or OPc value, etc., is mounted in advance is released. Therefore, the corresponding mobile carrier receives the manufactured SIM card and delivers the SIM card to a subscriber. Thereafter, if necessary, the SIM card may use technologies of over the air (OTA), etc., to perform managements of installation, modification, deletion, etc., of applications within the UICC. A subscriber inserts the UICC card into his/her own mobile communication terminal to use a network of the corresponding mobile carrier and application services. In addition, when replacing a terminal, a subscriber takes out the UICC card from the existing terminal and inserts the UICC card into a new terminal, such that the new terminal may use authentication information, a mobile communication telephone number, a personal telephone directory, etc., which are stored in the UICC as they are.

However, the SIM card is generally inconvenient for a mobile communication terminal user in receiving services of other mobile carriers. There could be an inconvenience in that the mobile communication terminal user needs to physically get the SIM card to receive services from a mobile carrier. For example, an inconvenience may occur when a mobile communication terminal user travels to other countries, and he or she needs to get an on-site SIM card to receive on-site mobile communication services. A roaming service may somewhat solve the foregoing inconveniences, but there is a problem in that the mobile communication terminal user may not wish to receive the roaming services due to an expensive fee and when a contract between providers are not established.

Meanwhile, a significant portion of the foregoing inconveniences may be solved by remotely downloading and installing the SIM module to and in the UICC card. That is, the SIM module of the mobile communication service to be used may be downloaded to the UICC card at the user's desired time. The UICC card may also download and install a plurality of SIM modules and may select and use only one of the plurality of SIM modules. The UICC card may be fixed in a terminal or may not be fixed in the terminal. In particular, the UICC fixed in the terminal is called an embedded UICC (eUICC). Generally, the eUICC fixed in the terminal means the UICC card which may download and select SIM modules remotely. According to various embodiments of present disclosure, the UICC card which may download and select the SIM module remotely is commonly called the eUICC. The UICC card fixed in the terminal or not fixed in the terminal among the UICC cards which may download and select the SIM modules remotely is commonly called the eUICC. Further, information on the downloaded SIM module is commonly used as the term eUICC profile.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide of a method and an apparatus for a communication connection by allowing a terminal to select a communication service in a communication system.

Another aspect of the present disclosure is to the provide a method and an apparatus for downloading a profile in real time to allow a terminal to perform a communication connection in a communication system.

Another aspect of the present disclosure is to the provide an apparatus and a method for providing a profile to a terminal in a communication system.

In accordance with an aspect of the present disclosure, a method for downloading a profile by a terminal is provided. The method includes acquiring information including an access token for transmitting a profile request to a profile server, transmitting a first message including the access token and a universal integrated circuit card (UICC) information of the terminal to the profile server, receiving a second message including a verification result from the profile server, and receiving a profile package corresponding to the access token from the profile server.

In accordance with an aspect of the present disclosure, a terminal is provided. The terminal includes a transceiver configured to transmit and receive a signal, and at least one processor configured to acquire information including an access token for transmitting a profile request to a profile server, transmit a first message including the access token and universal integrated circuit card (UICC) information of the terminal to the profile server, receive a second message including a verification result from the profile server, and receive a profile package corresponding to the access token from the profile server.

In accordance with an aspect of the present disclosure, a method for providing a profile by a profile server is provided. The method includes receiving a first message including an access token and a UICC information of a terminal from the terminal, verifying the terminal on the basis of the UICC information of the first message, transmitting a second message including a verification result to the terminal, and transmitting a profile package corresponding to the access token to the terminal.

In accordance with an aspect of the present disclosure, a profile server is provided. The profile server includes a transceiver configured to transmit and receiving a signal, and at least one processor configured to receive a first message including an access token and UICC information of a terminal from the terminal, verify the terminal on the basis of the UICC information of the first message, transmit the second message including a verification result to the terminal, and transmit a profile package corresponding to the access token to the terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5A and 5B are diagrams illustrating a procedure of downloading and installing a profile for an auxiliary terminal using the $0^{th}$ profile access key according to an embodiment of the present disclosure;

FIGS. 7A, 7B and 7C are diagrams illustrating a procedure of downloading and installing a profile for an auxiliary terminal using a second profile access key according to an embodiment of the present disclosure;

Throughout the drawings, it should be noted that like reference numbers are used to depict the same or similar elements, features, and structures.

DETAILED DESCRIPTION

Figure 1:
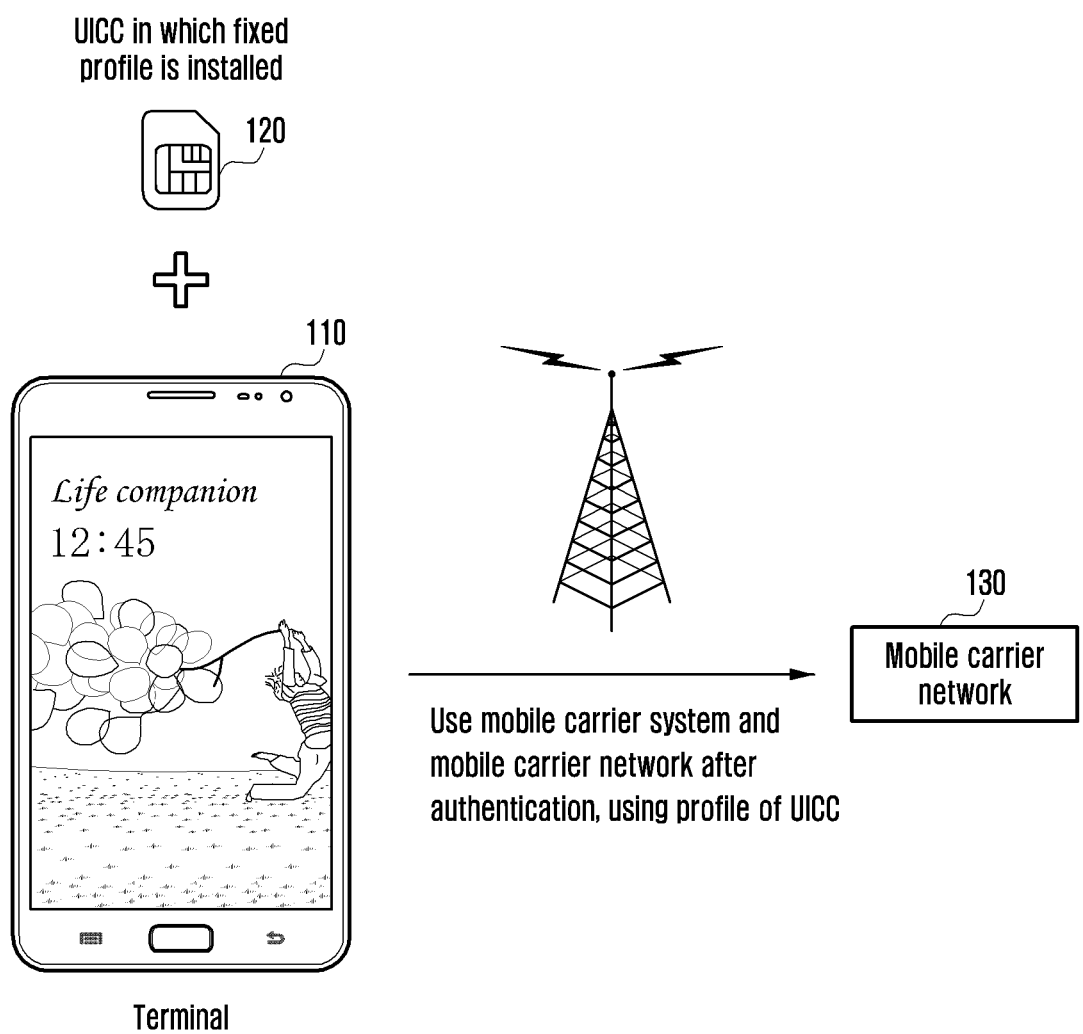
FIG. 1 is a diagram illustrating a mobile communication network connection method of a terminal using a universal integrated circuit card (UICC) in which a profile fixed in the terminal is installed, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understandings of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, a universal integrated circuit card (UICC) is a smart card inserted into a mobile communication terminal and means a chip storing personal information such as network access authentication information on a mobile communication subscriber, a telephone directory, and short message service (SMS) to perform subscriber authentication and a generation of a traffic security key upon an access to mobile communication networks such as global system for mobile (GSM), wideband code division multiple access (WCDMA), and long term evolution (LTE), thereby implementing the use of the safe mobile communication. The UICC includes communication applications such as a subscriber identification module (SIM), a universal SIM (USIM), and an internet protocol (IP) multimedia SIM (ISIM) according to a kind of mobile communication networks to which a subscriber is accessed. Further, the UICC may provide a high-level security function for including various applications such as an electronic wallet, ticketing, and an electronic passport.

In the present disclosure, an embedded UICC (eUICC) is not a detectable security module which may be inserted into and separated from a terminal but a chip-type security module which may be embedded in a terminal. The eUICC may use an over the air (OTA) technology to download and install a profile. The eUICC may be named the UICC which may download and install a profile.

In the present disclosure, a method for downloading and installing a profile to and in eUICC using the OTA technology may also be applied to a detachable UICC which may be inserted into and separated from the terminal. That is, the various embodiments of the present disclosure may be applied to the UICC which may download and install the profile using the OTA technology.

In the present disclosure, the term UICC mixed with the SIM may be used and the term eUICC mixed with an embedded SIM (eSIM) may be used.

In the present disclosure, a profile may mean that applications, a file system, an authentication key value, etc., which are stored in the UICC are packaged in a software form.

In the present disclosure, a USIM profile may be the same meaning as the profile or may mean that information included in a USIM application within the profile is packaged in the software form.

In the present disclosure, a profile providing server may be represented by subscription manager data preparation (SM-DP), subscription manager data preparation plus (SM-DP+), off-card entity of profile domain, a profile encryption serer, a profile generation server, a profile provisioner (PP), a profile provider, and a profile provisioning credentials holder (PPC holder).

In the present disclosure, a profile information transfer server may be represented by a discovery and push function (DPF) and a subscription manager discovery service (SM-DS).

In the present disclosure, a profile management server may be represented by subscription manager secure routing (SM-SR), subscription manager secure routing plus (SM-SR+), off-card entity of eUICC profile manager, or a profile management credentials holder (PMC holder), and an eUICC manager (EM).

In the present disclosure, when naming the profile providing server, the profile providing server may be commonly called as including a function of the profile management server. Therefore, according to various embodiments of the present disclosure, that is, in the following technology, an operation of the profile providing server may be performed by the profile management server. Similarly, an operation of the profile management server or the SM-SR may be of course performed by the profile providing server.

The term 'terminal' used in the present disclosure may be named a mobile station (MS), user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terms. Various embodiments of the terminal may not only include a cellular phone, a smart phone having a wireless communication function, a personal digital assistant (PDA), a wireless modem, a portable computer having a wireless communication function, a photographing apparatus such as a digital camera having the wireless communication function, a gaming apparatus having the wireless communication function, home appliances for storing and playing music having the wireless communication function, and internet home appliances which may implement a wireless internet access and browsing, but also include a portable unit or terminals in which combinations of the functions are integrated. Further, the terminal may include a machine to machine (M2M) terminal and a machine type communication (MTC) terminal/device, but is not limited thereto. In the present disclosure, the terminal may also be called an electronic apparatus.

In the present disclosure, the electronic apparatus may have a UICC, which may download and install a profile, embedded therein. When the UICC is not embedded in the electronic apparatus, the UICC physically separated from the electronic apparatus may be inserted into the electronic apparatus to be connected to the electronic apparatus. For example, the UICC may be inserted into the electronic apparatus in a card form. The electronic apparatus may include the terminal. In this case, the terminal may be a terminal including the UICC which may download and install the profile. The UICC may be embedded in the terminal and when the terminal is separated from the UICC, the UICC may be inserted into the terminal and may be inserted into the terminal to be connected to the terminal. The UICC which may download and install the profile may be named the eUICC by way of example.

In the present disclosure, a profile discriminator may be named a profile identifier (profile ID), an integrated circuit card ID (ICCID), and a factor matched with an ISD-P or a profile domain (PD). The profile ID may represent unique identifiers of each profile.

In the present disclosure, an eUICC identifier (eUICC ID) may be a unique identifier of the eUICC embedded in the terminal and may be named an EID. Further, when a provisioning profile is installed in the eUICC in advance, it may be a profile ID of the corresponding provisioning profile. Further, according to an embodiment of the present disclosure, when the terminal and the eUICC chip are not separated from each other, it may be a terminal ID. Further, it may also be called a specific security domain of the eUICC chip.

In the present disclosure, a profile container may be named the profile domain. The profile container may be the security domain.

In the present disclosure, an application protocol data unit (APDU) may be a message for interworking of the terminal with the eUICC. Further, the APDU may be a message for interworking of the PP or the profile management (PM) with the eUICC.

In the present disclosure, profile provisioning credentials (PPC) may be a means which is used for mutual authentication and profile encryption between the PP and the eUICC and a signature. The PPC may include at least one of a symmetric key, a Rivest Shamir Adleman (RSA) certificate and personal key, an elliptic curved cryptography (ECC) certificate and personal key, and a root certification authority (CA) and certificate chain. Further, when the PP is plural, different PMCs for the plurality of PM may be stored in the eUICC or used.

In the present disclosure, PMC may be a means which is used for mutual authentication and transmission data encryption between the PM and the eUICC and a signature. The PMC may include at least one of the symmetric key, the RSA certificate and personal key, the ECC certificate and personal key, and the root CA and certificate chain. Further, when the PM is plural, different PMCs for the plurality of PM may be stored in the eUICC or used.

In the present disclosure, an AID may be an application identifier. This value may be a discriminator which discriminates different applications within the eUICC.

In the present disclosure, a profile package tag, length, value (TLV) may be named a profile TLV. The profile package TLV may be a data set which represents information configuring a profile in a TLV format.

In the present disclosure, an authentication and key agreement (AKA) may represent authentication and key agreement and may represent authentication algorithm for accessing a 3GPP and 3 GPP2 network.

In the present disclosure, K is an encryption key value stored in the eUICC which is used for the AKA authentication algorithm.

In the present disclosure, OPc is a parameter value which may be stored in the eUICC which is used for the AKA authentication algorithm.

In the present disclosure, NAA may be a network access application program and may be application programs such as USIM and ISIM which are stored in the UICC for accessing a network. The NAA may be a network access module.

Further, when it is decided that a detailed description for the known function or configuration related to the present disclosure may obscure the gist of the present disclosure, the detailed description therefor will be omitted.

The following embodiment of the present disclosure provides the method for scanning a previously generated $0^{th}$ profile access key for downloading a profile with a terminal to acquire a dynamically generated first profile access key from a server and then providing a first profile access token to a server again to download a profile.

Further, a method for providing a previously generated first profile access token to a server and then downloading a profile so as to download the profile is provided.

Further, an embodiment of the present disclosure provides a method for displaying a first web screen provided from a server when a second profile access key is provided to the server, performing, by a user meeting a predetermined requirement, a user input and then providing a first profile access key from the server to a terminal, downloading a profile, additionally downloading the profile, and then displaying a second web screen on the terminal, to thereby download the profile.

According to an embodiment of the present disclosure, the $0^{th}$ profile access key may be a profile access key that is used to acquire the first profile access token. The terminal may provide the $0^{th}$ profile access key to the server and acquire information on the first profile access key or the first profile access token from the server. The $0^{th}$ profile access key may be the information for acquiring access information for downloading the profile from the profile server.

According to an embodiment of the present disclosure, the first profile access key may include the first profile access token information and the terminal may extract the first profile access token from the first profile access key and use the extracted first profile access token when the profile is downloaded from the profile server (for example, SM-DP+). The first profile access key or the first profile access token may be the information for downloading, by the terminal, the profile from the profile server. The first profile access key or the first profile access token may be the access information for downloading the profile from the profile server.

According to an embodiment of the present disclosure, the second profile access key may be the access information for receiving the information for downloading the profile from the profile access key management server. It is possible to acquire information on a web page and the information on the first profile access key on the basis of the second profile access key.

The $0^{th}$ profile access key, the first profile access key, and the second profile access key are used to identify the profile access key according to the usage and in an embodiment of the present disclosure, the profile access keys used as the function as described above may be identified by other methods or may also be given other names.

According to an embodiment of the present disclosure, an activation code may be information acquired from an activation voucher. The activation code and the activation voucher may also be used as the same meaning.

According to an embodiment of the present disclosure, the profile package and the profile may be used as the same meaning. Downloading the profile may mean downloading the profile package and installing the profile may mean installing the profile package.

In connection with the above-mentioned embodiment, an embodiment of the present disclosure provides a method for downloading a profile to eUICC of an auxiliary terminal using a main terminal and a method for downloading a profile from a single terminal to eUICC.

FIG. 1 is a diagram illustrating a mobile communication connection method of a terminal using a UICC in which a profile fixed in the terminal is installed according to an embodiment of the present disclosure.

Referring to FIG. 1, a UICC 120 may be inserted into a terminal 110. In this case, the UICC may be a detachable type and may also be embedded in the terminal in advance. A fixed profile of the UICC in which the fixed profile is installed means that 'access information' which may access a specific provider is fixed. The access information may be a so-called international mobile subscriber identity (IMSI) which is a subscriber discriminator and a K value or a Ki value which is required to authenticate a network along with the subscriber discriminator.

Then, the terminal may use the UICC to perform the authentication along with an authentication processing system (so-called home location register (HLR) or authentication center (AuC) of a mobile carrier. The authentication process may be an authentication and key agreement (AKA) process. If the authentication succeeds, the terminal may use a mobile communication network or mobile carrier network 130 of the mobile communication system to use mobile communication services such as a telephone or a use of mobile data.

Figure 2A:
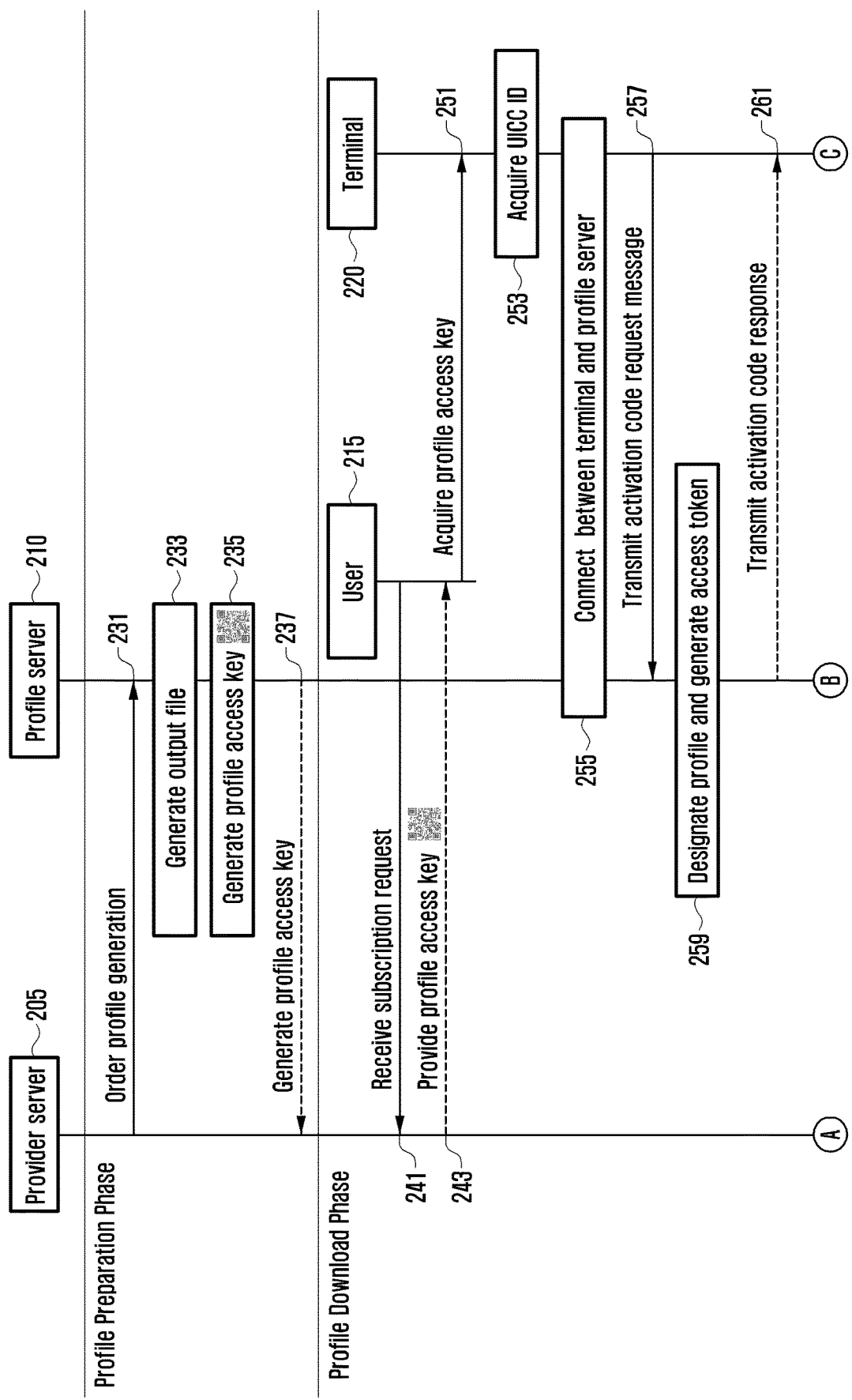
FIGS. 2A and 2B are diagrams illustrating a procedure of downloading and installing a profile using a $0^{th}$ profile access key according to an embodiment of the present disclosure.
Figure 2B:
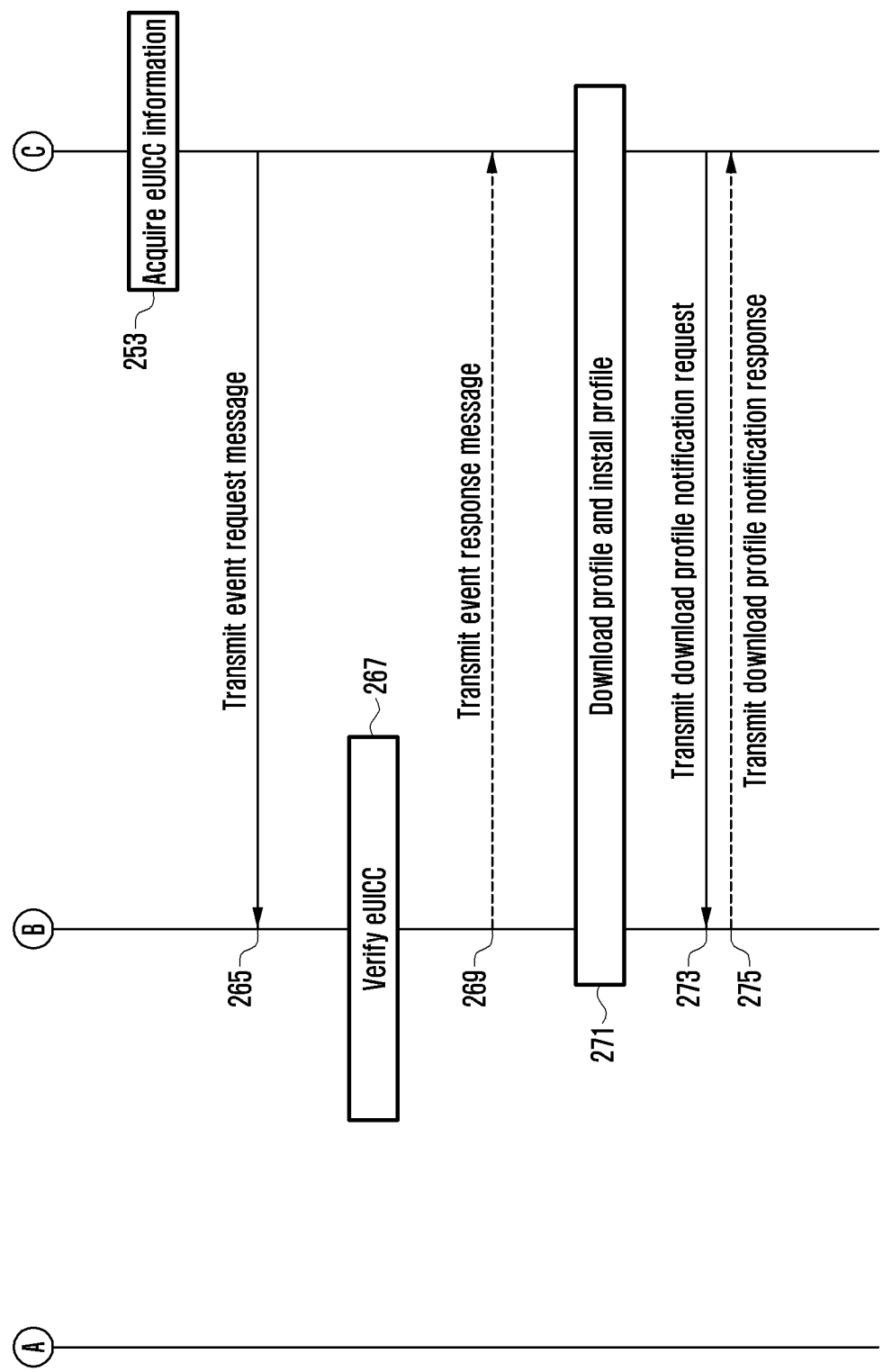

FIGS. 2A and 2B are diagrams illustrating a procedure of downloading and installing a profile using a $0^{th}$ profile access key according to an embodiment of the present disclosure.

The system of FIGS. 2A and 2B may include a provider server 205, a profile server 210, and a terminal 220. Further, the system may further include a user 215 and the user 215 may be an electronic device that receives an input from a user. The provider server 205 may be mobile network operator (MNO) and in the present disclosure, may be named a provider, a mobile carrier, a mobile carrier server, or the like. The profile server 210 may include a profile generation server and a profile providing server. The profile generation server and the profile providing server may be configured of one entity and may also be configured of independent entity. The profile generation server may be an SIM manufacturer server and may be named eUICC manufacture (EUM), an SIM manufacturer, or the like. The profile providing server may be named SM-DP, SM-DP+, or the like. The terminal 220 may include UICC. The UICC may be embedded in the terminal 220 and may also be inserted into the terminal 220. An UICC related operation may be performed in a local profile assistant (LPA) of the terminal 220. The LPA may also be named UICC application.

According to an embodiment of the present disclosure, to identify the $0^{th}$ profile access key, the $0^{th}$ profile access key value may be generated using a '0' value. The profile access key may also be named the activation code. For example, if a value of a code version field of the activation code is 0, it may be appreciated that the profile access key is the $0^{th}$ profile access key. The term '$0^{th}$ profile access key' is only a term for differentiating other profile access keys and therefore the name of the access key that performs the same function and/or purpose is not limited thereto. The terminal 220 may transfer the $0^{th}$ profile access key to the profile server 210 to obtain the first profile access token.

An example of the procedure of downloading and installing a profile using the $0^{th}$ profile access key and the first profile access token will be described below with reference to FIGS. 2A and 2B.

The embodiment of FIGS. 2A and 2B may be divided into a profile preparation phase and a profile downloading phase. The two phases are not necessarily divided into an independent operation. The profile preparation phase is a procedure of preparing an output file and a profile access key between the provider server 205 and the profile server 210 to download the profile. The phase of downloading a profile is a procedure of downloading, by a terminal, a profile through the process of authenticating and verifying, by the provider server 205, the profile server 210, and the terminal 220, the profile download according to the request of the terminal Profile Preparation Phase In operation 231, the provider server 205 may order the profile server 210 to generate the profile. The provider server 205 may order the generation of a plurality of profiles. The operation may be made between the provider and the SIM manufacturer. The provider may transmit an input file including a list of IMSI values or band information to the SIM manufacturer (EUM) to order the SIM manufacturer to generate the plurality of profiles. The process may be named profile ordering.

In operation 233, the profile server 210 may generate an output file. The profile server 210 may generate the output file on the basis of the ordering of the profile generation. The operation 233 may be performed in the SIM manufacturer or the SIM manufacturer server. The output file may include IMSI, ICCID, and Ki values. The SIM manufacturer may generate the information including the IMSI, ICCID, and Ki values for each profile and provide the generated information to the operation.

In operation 235, the profile server 210 may generate the $0^{th}$ profile access key. The SIM manufacturer may generate N $0^{th}$ profile access keys. The profile access key may have a text form and may also generate text information as image information in a quick response (QR) code form. The $0^{th}$ profile access key may be named the activation voucher. The generated text information or the image having the QR code form and the information thereon may also be called the activation voucher.

An example of the $0^{th}$ profile access key may be as follows.

Example of $0^{th}$ profile access key: 0$TEST.DP.COM$0123456789ABCDEFGHIJ

That is, it may consist of identifiers '0' and '$' differentiating the $0^{th}$ profile access key, an address of an SM-DP+ server to be accessed, '$', and the access token value of the $0^{th}$ profile access keys.

In the above example, "TEST.DP.COM" is an address of a server and "0123456789ABCDEFGHIJ" is the access token value. The '$' differentiating information may be replaced by other characters or signs.

In operation 237, the profile server 210 may provide the information on the output file and the profile access key (or activation voucher) to the provider server 205. For example, the SIM manufacturer provides the generated output file and N $0^{th}$ profile access key to a provider. In this case, the $0^{th}$ profile access key may have a form in which it is printed on paper. The operations 231 to 237 need to be performed prior to generating any one of N profiles.

Profile Download Phase

In operation 241, the provider server 205 may receive a subscription request. The provider may receive the subscription request which may be a subscription request from the user 215. The subscription may also be performed offline at a carrier agent and may also be performed online at a carrier web portal. The subscription request from the user 215 may be a subscription request received from an electronic device that the user 215 uses and may also be a subscription request from an operation operated by a carrier agent according to an intention expression of the user 215.

In operation 243, a provider may provide one of the $0^{th}$ profile access keys received in the operation 237 to the user 215. The $0^{th}$ profile access key may be provided in the form in which it is printed on paper and may also be provided through E-mail or a web portal.

In operation 251, the terminal 220 may acquire the $0^{th}$ profile access key. The user 215 may input the text information on the $0^{th}$ profile to the terminal 220 and when the $0^{th}$ profile access key is provided as the image information such as the QR code, may scan the image information to acquire the $0^{th}$ profile access key. For example, the user 215 uses an image acquiring apparatus (camera) of the terminal 220 to scan the QR code in which the $0^{th}$ profile access key is carved, thereby inputting the $0^{th}$ profile access key to an eUICC management application (local profile assistant (LPA)). Alternatively, the $0^{th}$ profile access key may also be input manually.

In operation 253, the terminal 220 may acquire an eUICC ID. The eUICC ID (EID) may be read from the eUICC embedded in the terminal 220.

In operation 255, the terminal 220 may be connected to the profile server 210 and may perform the authentication. The profile server 210 may be SM-DP+. The terminal 220 uses a hypertext transfer protocol over secure socket layer (HTTPS) protocol to perform the connection between the SM-DP+ and transport layer security (TLS). At this point, the TLS authentication may be performed by a server authentication mode that authenticates only the server.

In operation 257, the terminal 220 requests the activation code to the profile server 210. The terminal 220 may transmit an activation code request message. The activation code request message may be ES9_ActivationCodeRequest. The activation code request message may include the activation code and the electronic ID (EID). The terminal 220 may request the activation code request message including the $0^{th}$ profile access key and the EID to the SM-DP+.

In operation 259, the profile server 210 may designate the profile for the eUICC of the terminal 220 on the basis of the reception of the activation code request message and generate the access token for downloading the designated profile. The SM-DP+ may designate the profile on the basis of the received $0^{th}$ profile access key and generate the first profile access token included in the first profile access key that may download the designated profile. The first profile access token may be an EventID. The first profile access token may be security information for requesting the first profile. The designated profile may be identified by ICCID. Therefore, the SM-DP+ may determine the ICCID to designate the profile.

In operation 261, the profile server 210 may transmit an activation code response to the terminal 220. The activation code response may include the first profile access token. For example, the SM-DP+ may transmit the first profile access token to the terminal 220.

In operation 263, the terminal 220 may acquire the information of the eUICC. The terminal 220 may confirm ProtectedEID, eUICC certificate and EUM certificate, and eUICCInfo from the eUICC.

In operation 265, the terminal 220 may transmit an event request message to the profile server 210. The event request may include the first profile access token (EventID). The event request message may be ES9_EventRequest. The LPA of the terminal 220 may transmit ES9_EventRequest including the first profile access token (EventID) to the SM-DP+. The event request message may include EventID, ProtectedEID, eUICC certificate, eUICCInfo, terminal information, or the like.

In operation 267, the profile server 210 verifies the eUICC. For example, the SM-DP+ may verify an eUICC signature included in the ProtectedEID.

In operation 269, the profile server 210 transmits an event response message to the terminal 220. The event response message may include a verification result, an event type, and information for profile download preparation.

In operation 271, the profile server 210 may perform additional communication with the terminal 220 and transmit an encrypted profile package corresponding to the EventID to the terminal 220. The terminal 220 transmits the received profile package to the eUICC in the terminal and the eUICC installs all or a part of the encrypted profile package in the eUICC.

In operation 273, the terminal 220 may transmit a DownloadProfileNotificationRequest to the profile server 210. For example, the terminal 220 may transmit a notification message received from the eUICC to the SM-DP+. The download profile notification request may include information on RemoteRequestResult and the eUICC certificate.

In operation 275, the profile server 210 may transmit a DownloadProfileNotificationResponse to the terminal 220.

Figure 3A:
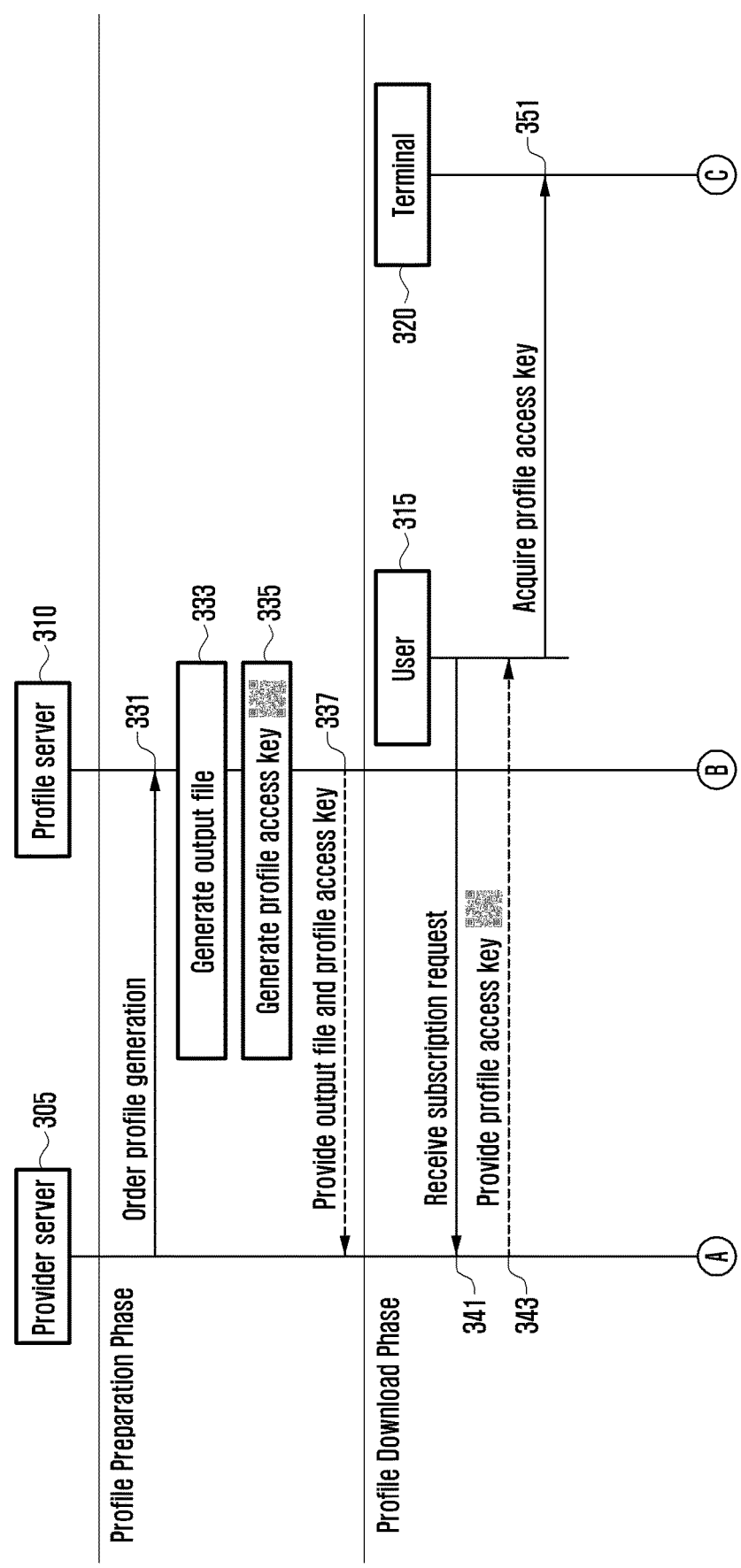
FIGS. 3A and 3B are diagrams illustrating a procedure of downloading and installing a profile using a first profile access key according to an embodiment of the present disclosure.
Figure 3B:
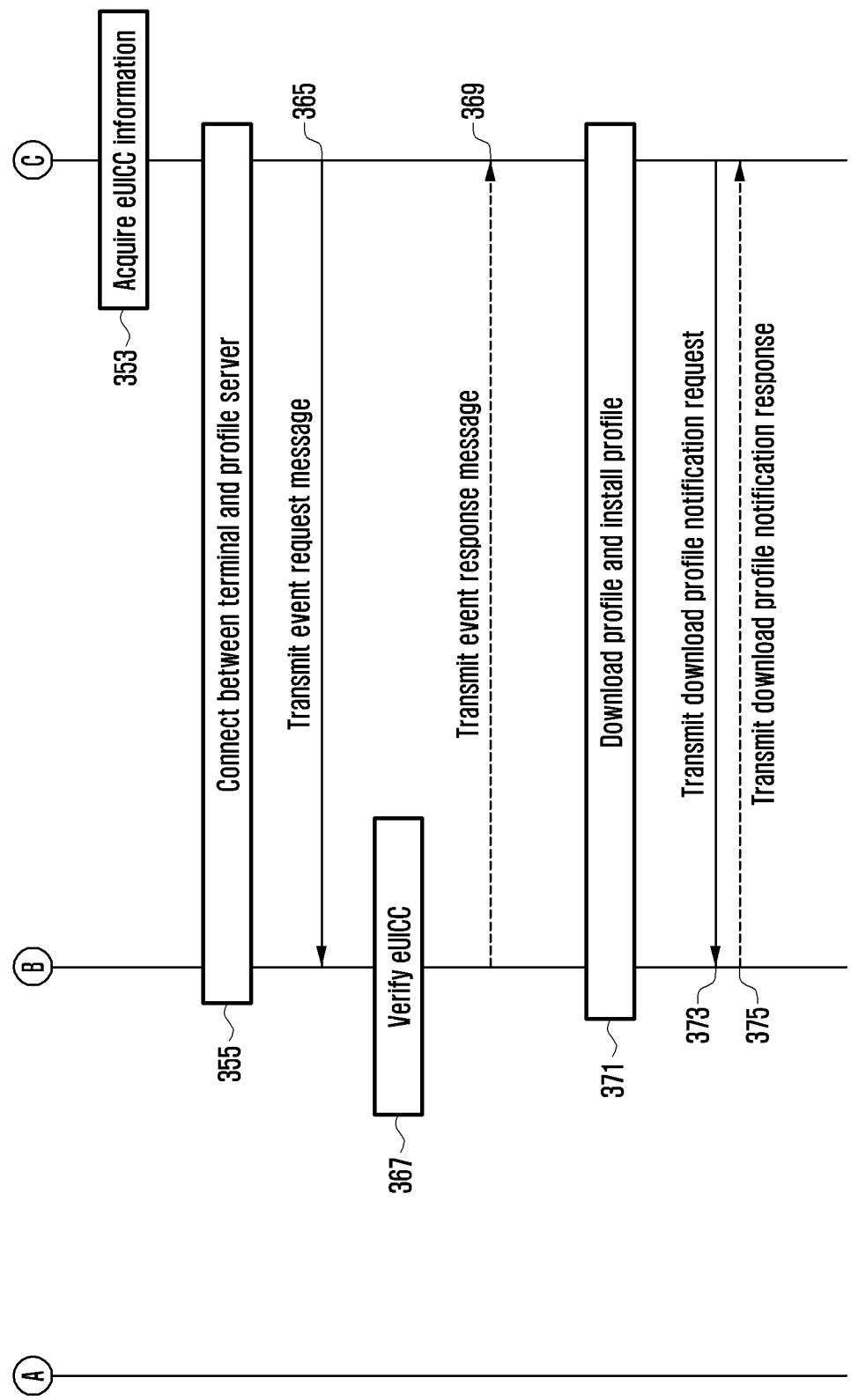

FIGS. 3A and 3B are diagrams illustrating a procedure of downloading and installing a profile using a first profile access key according to an embodiment of the present disclosure.

The system of FIGS. 3A and 3B may include a provider server 305, a profile server 310, and a terminal 330. Further, the system may further include a user 315. The content of the provider server 305, the profile server 310, the terminal 330, and the user 315 will be described with reference to FIGS. 2A and 2B. The operations of FIGS. 3A and 3B corresponding to FIGS. 2A and 2B refer to the operations of FIGS. 2A and 2B.

According to an embodiment of the present disclosure, to identify the first profile access key, the first profile access key value may be generated using a '1' value. At this point, the first profile access key includes the first profile access token. The first profile access token may be named the EventID, an activation token, or a MatchingID. If the first profile access key is input to the terminal 320, the terminal 320 may extract the first profile access token from the first profile access key and transmit the extracted first profile access token to the SM-DP- and may download the profile from the SM-DP+.

Hereinafter, an example of the procedure of downloading and installing a profile using the first profile access key and the first profile access token will be described with reference to FIGS. 3A and 3B.

Profile Preparation Phase

In operation 331, the provider server 305 may order the profile server 310 to generate the profile. The provider server 305 may order the generation of the plurality of profiles. The operation may be made between the provider and the SIM manufacturer. The provider may transmit the input file including the list of IMSI values or the band information to the SIM manufacturer (EUM) to order the SIM manufacturer to generate the plurality of profiles. The process may be named profile ordering.

In operation 333, the profile server 310 may generate the output file. The profile server 310 may generate the output file on the basis of the ordering of the profile generation. The operation 333 may be performed in the SIM manufacturer or the SIM manufacturer server. The output file may include the IMSI, ICCID, and Ki values. The SIM manufacturer may generate the output file including the IMSI, ICCID, and Ki values for N profiles. Further, the SIM manufacturer may generate the first profile access token (EventID) corresponding to an individual profile.

The SIM manufacturer may generate N $0^{th}$ profile access keys. The profile access key may have a text form and may also generate the text information as the image information in the QR code form. The first profile access key may be named the activation voucher. The generated text information or the image having the QR code form and the information thereon may also be named the activation voucher.

An example of the first profile access key may be as follows.

First profile access token: 0123456789ABCDEFGHIJ
Example of first profile access key: 1$TEST.DP.COM$0123456789ABCDEFGHIJ That is, it may consist of identifiers ' 1' and '$' differentiating the first profile access key, the address of the SM-DP+ server to be accessed, '$', and the first profile access key of the access token values.

In the above example, "TEST.DP.COM" is an address of a server and "0123456789ABCDEFGHIJ" is the access token value. The '$' differentiating information may be replaced by other characters or signs.

The first profile access token may also include the server address information. In this case, the first profile access token may be as follows in the foregoing example.

Another example of first profile access token: TEST.DP.COM$0123456789ABCDEFGHIJ

In the above example, the '$' may also use other identifiers as the identifier for identifying each information. In other words, ':' may also be used as the identifier.

In operation 337, the profile server 310 may provide the information on the output file and the profile access key (or activation voucher) to the provider server 305. For example, the SIM manufacturer provides the generated output file and N first profile access keys to the provider. At this point, the first profile access key may have the form in which it is printed on paper. The operations 331 to 337 need to be performed prior to generating any one of N profiles.

Profile Download Phase

In operation 341, the provider server 305 may receive a subscription request. The provider may receive the subscription request which may be the subscription request from the user 315. The subscription may also be performed offline at a carrier agent and may also be performed online at a carrier web portal. The subscription request from the user 315 may be a subscription request received from an electronic device that the user 315 uses and may also be a subscription request from an operation operated by a carrier agent according to an intention expression of the user 315.

In operation 343, a provider may provide one of the first profile access keys received in the operation 337 to the user 315. The first profile access key may be provided in the form in which it is printed on paper and may also be provided through E-mail or a web portal.

In operation 351, the terminal 320 may acquire the first profile access key. The user 315 may input the text information on the first profile to the terminal 320 and when the first profile access key is provided as the image information such as the QR code, may scan the image information to acquire the first profile access key. For example, the user 315 uses the camera of the terminal 320 to scan the QR code in which the first profile access key is carved, thereby inputting the first profile access key to the eUICC management application (for example, LPA) of the terminal 320. Alternatively, the first profile access key may also be input manually.

In operation 353, the terminal 320 may acquire the information of the eUICC. The terminal 320 may confirm the eUICC ID (EID) from the eUICC embedded therein. The terminal 320 may confirm the ProtectedEID, the eUICC certificate and EUM certificate, and the eUICCInfo from the eUICC.

In operation 355, the terminal 320 may be connected to the profile server 310 and may perform the authentication. The terminal 320 uses the HTTPS protocol to perform the connection between the SM-DP+ and the TLS. At this point, the TLS authentication may be performed by the server authentication mode that authenticates only the server.

In operation 365, the terminal 320 may transmit the event request message to the profile server 310. The event request may include the first profile access token (EventID). The event request message may be ES9_EventRequest. The LPA of the terminal 320 may transmit ES9_EventRequest including the first profile access token (EventID) to the SM-DP+. The event request message may include EventID, ProtectedEID, eUICC certificate, eUICCInfo, terminal information, or the like.

In operation 367, the profile server 310 verifies the eUICC. For example, the SM-DP+ may verify the eUICC signature included in the ProtectedEID.

In operation 369, the profile server 310 transmits the event response message to the terminal 320. The event response message may include the verification result, the event type, and the information for profile download preparation.

In operation 371, the profile server 310 may perform additional communication with the terminal 320 and transmit the encrypted profile package corresponding to the EventID to the terminal 320. The terminal transmits the received profile package to the eUICC in the terminal 320 and the eUICC installs all or a part of the encrypted profile package in the eUICC.

In operation 373, the terminal 320 may transmit the DownloadProfileNotificationRequest to the profile server 310. For example, the terminal 320 may transmit the notification message received from the eUICC to the SM-DP+.

The download profile notification request may include information on the RemoteRequestResult and the eUICC certificate.

In operation 375, the profile server 310 may transmit the DownloadProfileNotificationResponse to the terminal 320.

Figure 4A:
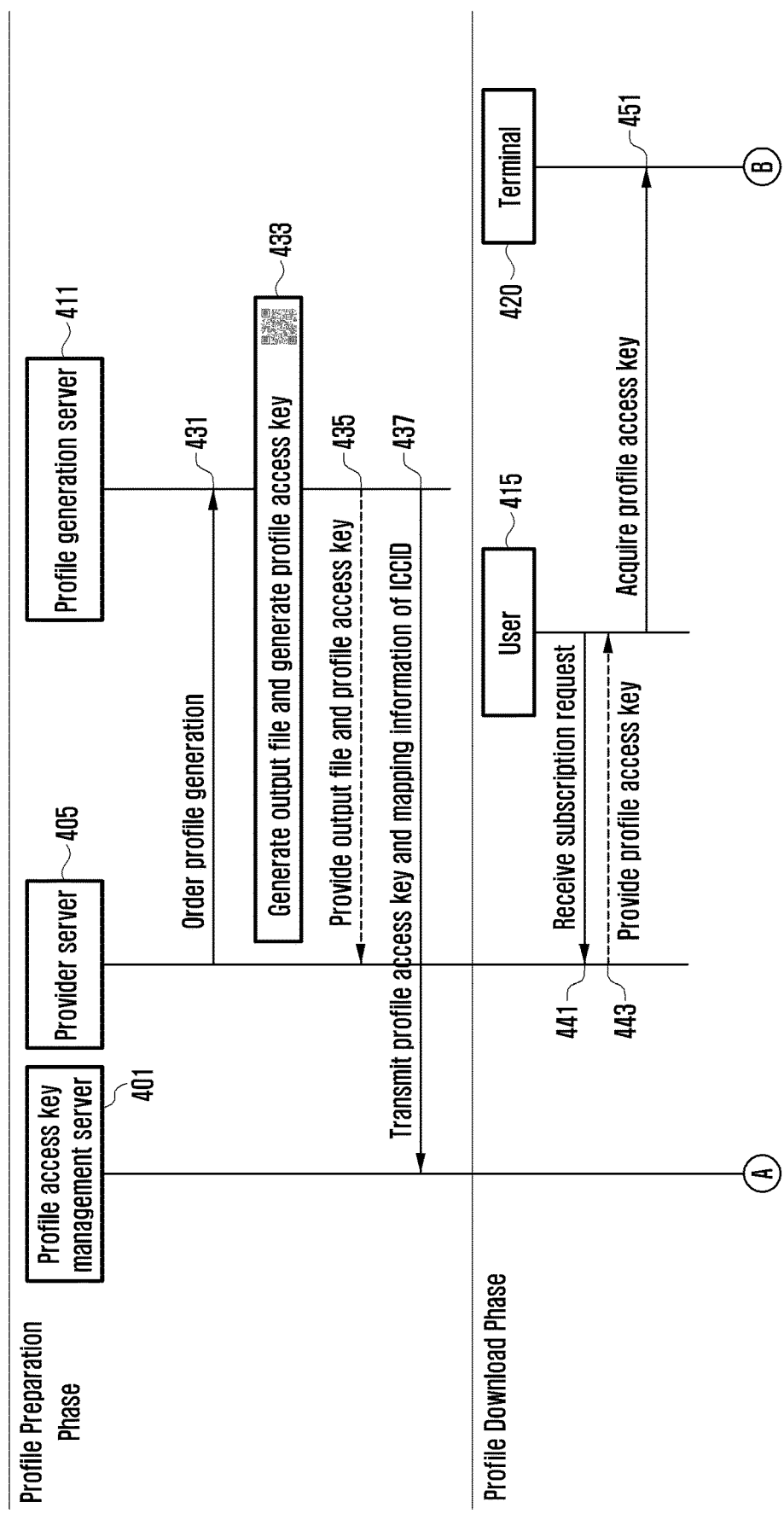
FIGS. 4A, 4B and 4C are diagrams illustrating a procedure of downloading and installing a profile using a second profile access key according to an embodiment of the present disclosure.
Figure 4B:
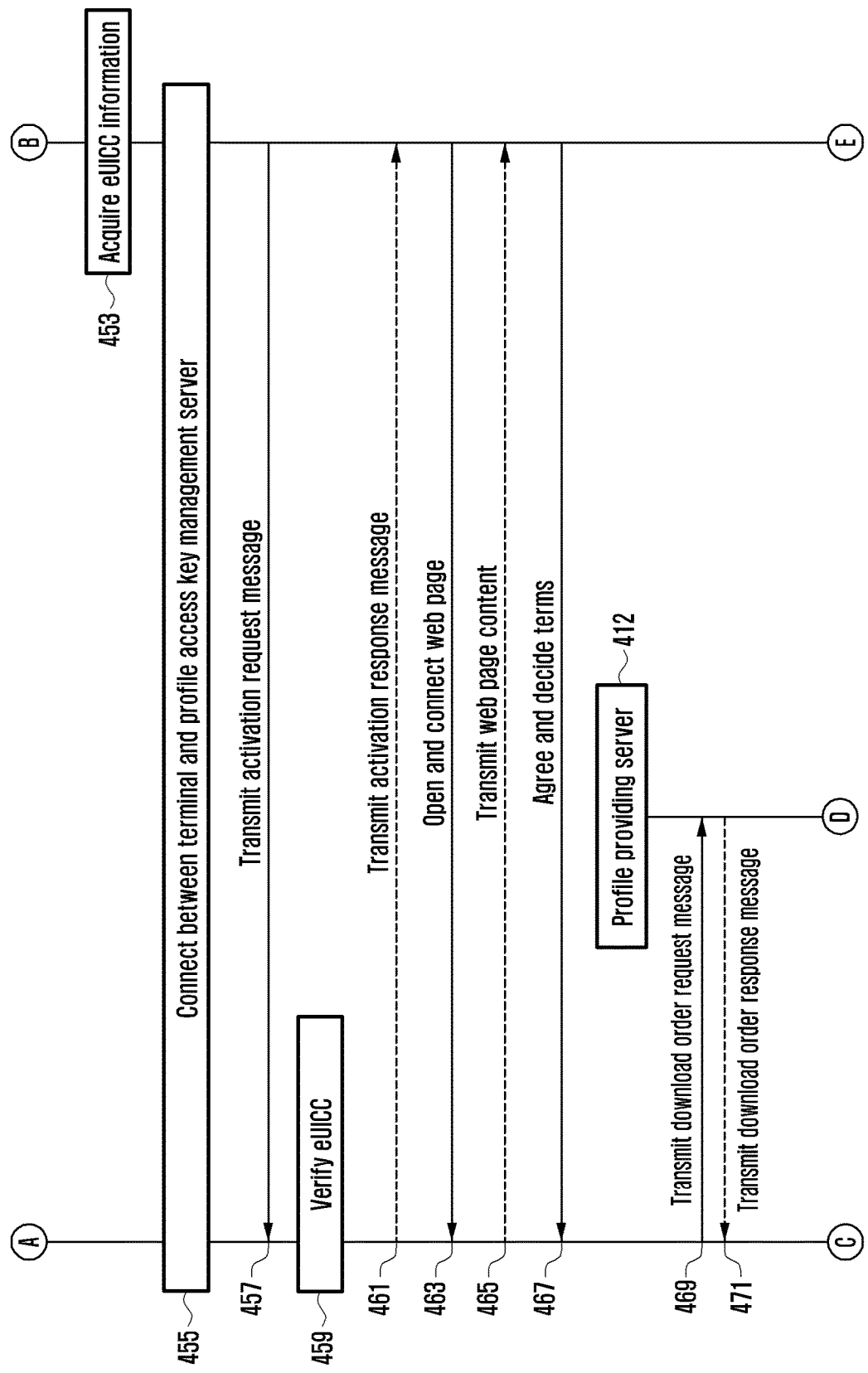
Figure 4C:
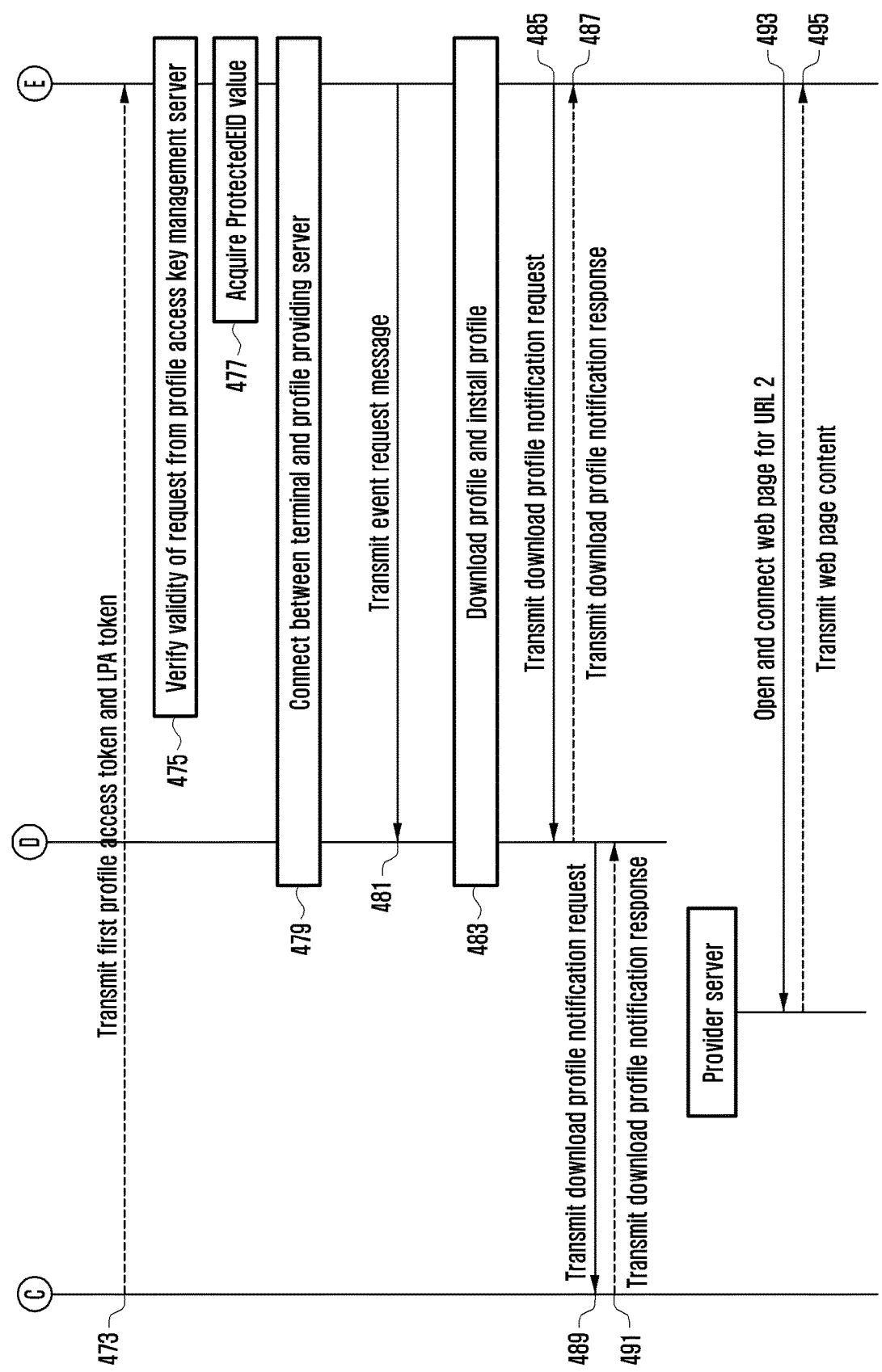

FIGS. 4A, 4B and 4C are diagrams illustrating a procedure of downloading and installing a profile using a second profile access key according to an embodiment of the present disclosure.

The system of FIGS. 4A, 4B and 4C may include a profile access key management server 401, a provider server 405, a profile generation server 41, a profile providing server 412, and a terminal 420. Further, the system may further include a user 415. The profile access key management server 401 may be a server for managing the second profile access key. The profile access key management server 401 may be named an activation voucher (AV) server. The profile generation server 411 may be an EUM server. The profile providing server 412 may be the SM-DP+. The profile generation server 411 and the profile providing server 412 may be included in the profile server. The operation corresponding to FIGS. 2A, 2B, 3A and 3B in the operation and content of the provider server 405, the profile server, the terminal 330, and the user 415 refers to the content described in FIGS. 2A, 2B, 3A and 3B.

Second profile access key management server (Activation Voucher Server).

FIGS. 4A, 4B and 4C illustrate that to download the profile, when the second profile access key is provided to the profile access key management server 401, the first web screen provided from the server is displayed on the terminal 420. After the input of the user satisfying the predetermined condition, the terminal receives the first profile access key from the profile access key management server 401. The terminal 420 may download the profile using the first profile access key, additionally download the profile, and then display the second web screen on the terminal.

Hereinafter, an example of the procedure of downloading and installing a profile using the second profile access key and the second profile access token will be described with reference to FIGS. 4A, 4B and 4C.

Profile Preparation Phase

In operation 431, the provider server 405 may order the profile generation server 411 to generate the profile. The provider server 405 may order the generation of the plurality of profiles. The operation may be made between the provider and the SIM manufacturer. The provider may transmit the input file including the list of IMSI values or the band information to the SIM manufacturer (EUM) to order the SIM manufacturer to generate the plurality of profiles. The process may be named profile ordering.

In operation 433, the profile generation server 411 may generate the output file. The profile generation server 411 may generate the output file on the basis of the ordering of the profile generation. The output file may include the IMSI, ICCID, and Ki values. The SIM manufacturer may generate the output file including the IMSI, ICCID, and Ki values for N profiles. Further, the profile generation server 210 may generate the second profile access key. For example, the SIM manufacturer may generate N second profile access keys. The second profile access key may also have the text form and may also generate the text information as the image information in the QR code form. The second profile access key may be named the activation voucher. The generated text information or the image having the QR code form and the information thereon may also be named the activation voucher.

An example of the second profile access key may be as follows.

Second profile access token: 0123456789ABCDEFGHIJ
Example of second profile access key: 2$TEST.SERVER.COM$0123456789ABCDEFGHIJ In operation 435, the profile server 411 may transmit the information on the output file and the profile access key (or activation voucher) to the provider server 405. For example, the SIM manufacturer provides the generated output file and N second profile access key to the provider. At this point, the second profile access key may have the form in which it is printed on paper.

In operation 437, the profile generation server 411 may transmit the second profile access key and the mapping information of the ICCID to the profile access key management server 401. The profile access key management server 401 may generate the second profile access key. For example, the SIM manufacturer may transmit the generated second profile access key and mapping information of the ICCID value to the profile access key management server.

The operations 431 to 437 need to be performed prior to generating any one of N profiles.

Profile Download Phase

In operation 441, the provider server 405 may receive a subscription request. The provider may receive the subscription request which may be the subscription request from the user 415. The subscription may also be performed offline at a carrier agent and may also be performed online at a carrier web portal.

In operation 443, the provider may provide one of the second profile access keys (or activation code) received in the operation 435 to the user 415. The second profile access key may be provided in the form in which it is printed on paper and may also be provided through E-mail or a web portal.

In operation 451, the terminal 420 may acquire the second profile access key. The user 415 may input the text information on the second profile to the terminal 420 and when the second profile access key is provided as the image information such as the QR code, may scan the image information to acquire the second profile access key. For example, the user 415 uses the camera of the terminal 420 to scan the QR code in which the second profile access key is carved, thereby inputting the second profile access key to the eUICC management application of the terminal 420. Alternatively, the second profile access key may also be input manually.

In operation 453, the terminal 220 may acquire the information of the eUICC. The terminal 420 may confirm ProtectedEID, certs_eUICC, and eUICCInfo information from the eUICC. As the EventID factor used to read the ProtectedEID, some information of the second profile download key may be reused as follows. At this point, an intermediate special character '$' may be substituted for compatibility as ':' or the like.

Second profile access key: 2$AV-SERVER.GSMA.COM$1234567890ABCDEFGHIJ
Input for ProtectedEID: AV-SERVER.GSMA.COM:1234567890ABCDEFGHIJ It may consist of identifiers '2' and '$' identifying the second profile access key and an address of an AV server to be accessed, $, and the access token value of the first profile access keys.

In operation 455, the terminal 420 may perform the connection with the profile access key management server 401. Since the information acquired by the terminal 420 is the second profile access key (that is, first information of activation voucher is 2), the LPA of the terminal 420 may first use the web view function included in the LPA and use the server address information included in the second profile access key to perform the connection of the TLS with the corresponding server. The TLS connection may be established to accept the connection in the terminal only in the case of a previously designated specific server certificate or a sub certification of a previously designated root certification. The sub certificate may be a type in which the terminal may permit the connection as long as the certificate is connected by the personal key signature in a manner in which it includes a sub certificate is signed with a personal key corresponding to a public key of the root certificate and it includes a sub certificate of the sub certificate signed with the personal key corresponding to the public key of the sub certificate.

In operation 457, the terminal may transmit the activation request message to the profile access key management server 401. The activation request message may be ES9_ActivationRequest. The eUICC management application (LPA) of the terminal 420 transmits an ES9_ActivationRequest message to the profile access key management server 401. The ES9_ActivationRequest message may include at least one of the following information.

Second profile download key
protectedEID
certs_eUICC
displayType

Information on display size of a main terminal (for example, information for identifying a smart phone, a tablet, and a smart watch. When the main terminal is the smart phone, the displayType value may be set to be 0)

In operation 459, the profile access key management server 401 verifies the eUICC. For example, the profile access key management server 401 verifies the eUICC signature included in the ProtectedEID. The verification may be a process of including a type using a public key of an eUICC certificate.

In operation 461, the profile access key management server 401 may transmit the activation response message to the terminal 420. The profile access key management server 401 may use the second profile access key to provide the terminal 420 with at least one of a first uniform resource locator (URL) and a second URL that the corresponding terminal 420 may access. The corresponding URL may also be changed depending on the displayType. The first URL may be an URL for a web page that guides the description of the use method of the second profile access key. Further, the second URL may be a provider web portal address. A generation of a web portal account is described and it may be a web portal address welcoming a subscription. The web portal page may be named a welcome page.

In operation 463, the terminal 420 may open the web page on the basis of the first URL address. The terminal 420 may perform the TLS connection with the server of the first URL address by a similar method to one described in the operation 453. A HTTP request message used for the web server access includes the second profile access key, the ProtectedEID, the certs_eUICC, the eUICCInfo, the TerminalInfo, the LPA ContactInfo, and an LPA token. The profile access key management server 401 selects the profile corresponding to the second profile access key or the profile. Further, the SM-DP+ address is selected. For this purpose, at least one SM-DP+ address may be established in the profile access key management server.

In operation 465, the profile access key management server 401 transmits the content of the web page corresponding to the URL 1 to the terminal. At this point, content may be optimized in consideration of the received displayType. The web page information may include contents such as the use method of the second profile access key, use terms, and a user agreement guidance.

In operation 467, the terminal 420 may receive the user input corresponding to the confirmation and transmit the corresponding information to the profile access key management server 401. The user 415 selects a confirmation button as being guided to the web page to display an agreement intention to agreement.

In operation 469, the profile access key management server 401 transmits a download order request message to the profile providing server 412. For example, the profile access key management server 401 selects the SM-DP+ to perform the profile download order. The profile download order is a message performing at least one of ES2+.DownloadOrder, ES2+.ConfirmOrder, and ES2+.ReleaseProfile messages. The download order request message includes information on an event and an MNO ID. The event may include information on ICCID, EID, EventType, and ProfileState.

In operation 471, the profile providing server 412 may transmit a download order response to the profile access key management server 401. The download order response may include the EventID. In this process, the profile access key management server 410 may receive the first profile access token.

In operation 473, the profile access key management server 401 may generate information that includes the transmitted first profile access token and the LPA token that may call the LPA of the terminal. The information may be Javascript information.

In operation 475, the terminal 420 may verify whether the request from the profile access key management server 401 is an effective request. For example, the LPA of the terminal 420 may verify the LAP token to verify whether the request from the profile access key management server 401 is an effective request. When the verification succeeds, operation 477 is performed when the verification fails, the next operation is not performed.

In the operation 477, the ProtectedEID value may be acquired. The LPA of the terminal 420 may provide the information including the EventID to the eUICC to receive the ProtectedEID value.

In operation 479, the terminal 420 may perform the connection with the profile providing server 412 and may perform the authentication. The profile providing server 412 may be the SM-DP+. The terminal 420 uses the HTTPS protocol to perform the connection between the SM-DP+ and the TLS. At this point, the TLS authentication may be performed by the server authentication mode that authenticates only the server. In operation 481, the terminal 420 may transmit the event request message to the profile providing server 412. The event request may include the first profile access token (EventID). The event request message may be ES9_EventRequest. The LPA of the terminal 420 may transmit ES9_EventRequest including the first profile access token (EventID) to the SM-DP+.

In operation 483, the profile providing server 412 may verify the eUICC and provide the profile to terminal 420. The SM-DP+ may verify the eUICC signature included in the ProtectedEID. The SM-DP+ may perform additional communication with the terminal 420 and transmit the encrypted profile package corresponding to the EventID to the terminal 420. The terminal 420 transmits the received profile package to the eUICC in the terminal and the eUICC installs all or a part of the encrypted profile package in the eUICC.

In operation 485, the terminal 420 may transmit the DownloadProfileNotificationRequest to the profile providing server 412. The download profile notification request may include information on the RemoteRequestResult and the eUICC certificate. In operation 487, the profile providing server 412 may transmit the DownloadProfileNotification-Response to the terminal 420.

In operation 489, the profile providing server 412 may transmit the DownloadProfileNotificationRequest to the profile access key management server 401. In operation 491, the profile access key management server 401 may transmit the DownloadProfileNotificationResponse to the profile providing server 412.

In operation 493, the terminal 420 may be connected with the web page for the MNO on the basis of the second URL address. The terminal 420 may use URL2 information received in the operation 461.

In operation 495, the provider server 405 may provide the content of the web page to the terminal 420. The web page content may include a welcome message, create an account for MNO portal, or the like.

Figure 5A:
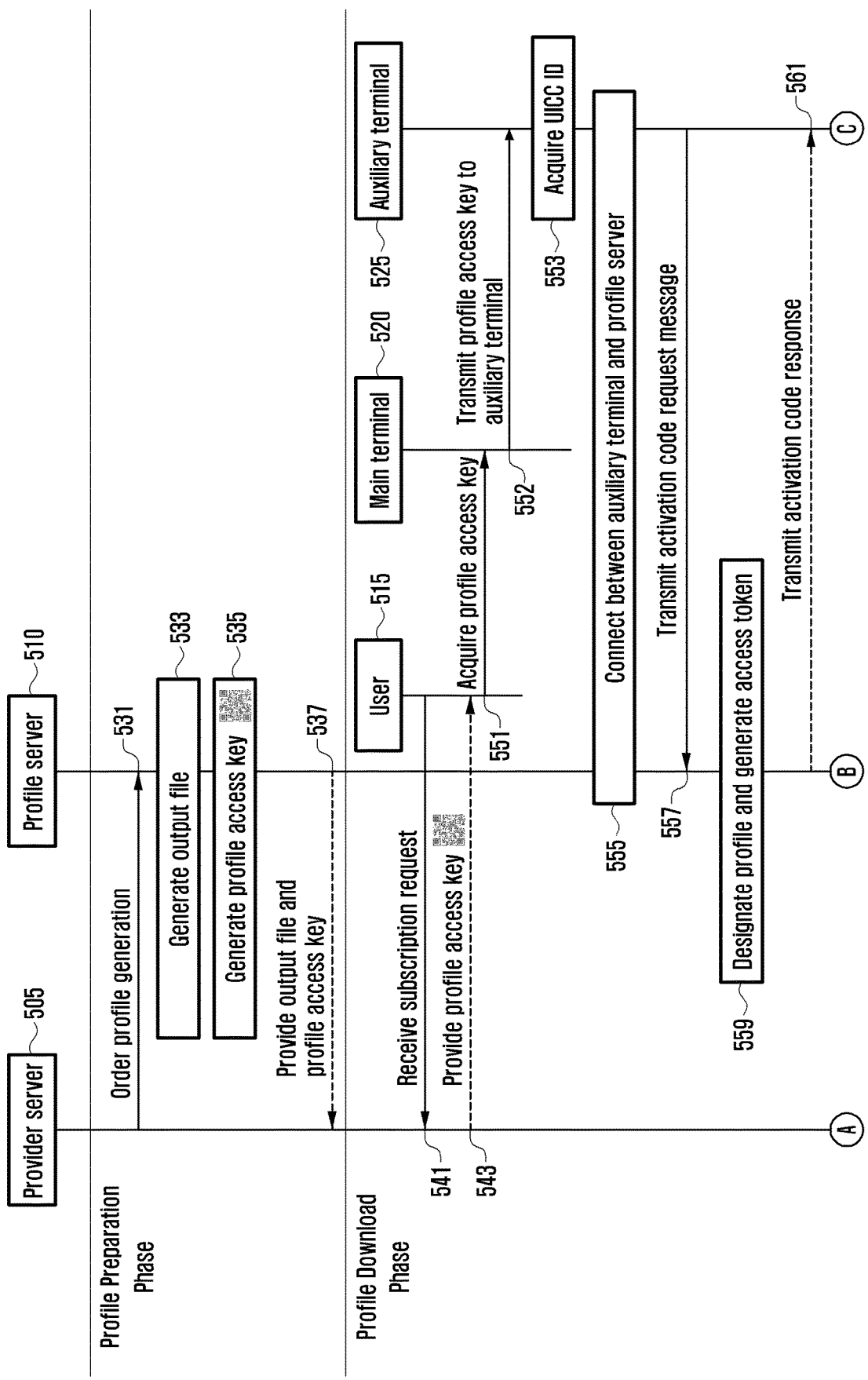

FIGS. 5A and 5B are diagrams illustrating a procedure of downloading and installing a profile for an auxiliary terminal using the $0^{th}$ profile access key according to an embodiment of the present disclosure.

Referring to FIGS. 5A and 5B, a procedure of downloading and installing an eUICC remote profile using the $0^{th}$ profile access key starts. The system of FIGS. 5A and 5B may include the provider server 305, a profile server 510, a main terminal 520, and an auxiliary terminal 525. Further, the system may further include a user 515. The configuration of the provider server 305, the profile server 510, and the user 515 refers to the entity description corresponding to FIGS. 2A, 2B, 3A, 3B, 4A, 4B and 4C. The configuration of the main terminal 520 and the auxiliary terminal 525 refers to the configuration of the terminal described with reference FIGS. 2A, 2B, 3A, 3B, 4A, 4B and 4C. The main terminal 520 may be named a primary device and the operation of the main terminal 520 may be performed by the auxiliary terminal management application installed in the main terminal 520. Further, some of the operations of the main terminal 520 may be performed by an auxiliary terminal management application installed in the main terminal 520. The auxiliary terminal 525 may be named a companion device, an assistance device, a secondary device, or the like. The auxiliary terminal may be a device that may be connected or paired by WiFi, Bluetooth, or the like. The auxiliary terminal 525 may include the LPA and the eUICC.

To identify the $0^{th}$ profile access key, the $0^{th}$ profile access key value may be generated using a '0' value. The profile access key may also be named the activation code. The terminal may transmit the $0^{th}$ profile access key to the server to obtain the first profile access token. Hereinafter, an example of the procedure of downloading and installing a profile using the $0^{th}$ profile access key and the first profile access token will be described with reference to FIGS. 5A and 5B.

Profile Preparation Phase

In operation 531, the provider server 505 may order the profile server 510 to generate the profile. The provider server 505 may order the generation of the plurality of profiles. The operation may be made between the provider and the SIM manufacturer. The provider may transmit an input file including the list of IMSI values or the band information to the SIM manufacturer (EUM) to order the SIM manufacturer to generate the plurality of profiles. The process may be named the profile ordering.

In operation 533, the profile server 510 may generate the output file. The profile server 510 may generate the output file on the basis of the ordering of the profile generation. The operation 533 may be performed in the SIM manufacturer or the SIM manufacturer server. The output file may include the IMSI, ICCID, and Ki values. The SIM manufacturer 510 may generate the information including the IMSI, ICCID, and Ki values for each profile and provide the generated information to the operation.

In operation 535, the profile server 510 may generate the $0^{th}$ profile access key. The SIM manufacturer 510 may generate N $0^{th}$ profile access keys. The access key may have a text form and may also generate the text information as the image information in the QR code form. An example of the $0^{th}$ profile access key may be as follows. The $0^{th}$ profile access key may be named the activation voucher. The generated text information or the image having the QR code form and the information thereon may also be named the activation voucher.

Example of $0^{th}$ profile access key: 0$TEST.DP.COM$0123456789ABCDEFGHIJ

That is, it may consist of identifiers '0' and '$' differentiating the $0^{th}$ profile access key, the SM-DP+server address to be accessed, $, and the access token value of the $0^{th}$ profile access keys. In the above example, "TEST.DP.COM" is a server address and "0123456789ABCDEFGHIJ" is the access token value.

In operation 537, the profile server 510 may provide the information on the output file and the profile access key (or activation voucher) to the provider server 505. For example, the SIM manufacturer provides the generated output file and N $0^{th}$ profile access key to a provider. In this case, the $0^{th}$ profile access key may have a form in which it is printed on paper. The operations 531 to 337 need to be performed prior to generating any one of N profiles.

Profile Download Phase

In operation 541, the provider server 505 may receive a subscription request. The provider may receive the subscription request which may be the subscription request from the user 515.

In operation 543, the provider server 505 may provide one of the $0^{th}$ profile access keys to the user 515. The provider provides one of the $0^{th}$ profile access keys received in the operation 537 to the user 515. The subscription may also be performed offline at a carrier agent and may also be performed online at a carrier web portal. The $0^{th}$ profile access key may be provided in the form in which it is printed on paper and may also be provided through E-mail or a web portal.

In operation 551, the main terminal 520 may acquire the $0^{th}$ profile access key. The user 515 may input the text information on the $0^{th}$ profile to the terminal 520 and when the $0^{th}$ profile access key is provided as the image information such as the QR code, may scan the image information to acquire the $0^{th}$ profile access key. For example, in the state in which the main terminal 520 and the auxiliary terminal 525 are paired, the user 515 may use the camera of the main terminal 520 to scan the QR code in which the $0^{th}$ profile access key is carved, thereby inputting the $0^{th}$ profile access key to the auxiliary terminal management application (for example, gear manager application) of the main terminal 520. Alternatively, the user 515 may also input the acquired $0^{th}$ profile access key to the main terminal 520 manually. Further, if the QR code is scanned with the main terminal before the main terminal 520 is paired with the auxiliary terminal 525, the main terminal 520 may also temporarily store the $0^{th}$ profile access key acquired when paired with the auxiliary terminal 525 to transmit the $0^{th}$ profile access key to the auxiliary terminal 525. The stored information may be transmitted to the auxiliary terminal 525 when the main terminal 520 is connected to the auxiliary terminal 525.

In operation 552, the main terminal 520 transmits the $0^{th}$ profile access key to the auxiliary terminal 525. For example, the auxiliary terminal management application of the main terminal 520 transmits the $0^{th}$ profile access key to the auxiliary terminal 520. The near field communication technologies such as Wireless Fidelity (WiFi), Bluetooth (BT), and near field communication (NFC) or the general internet protocol (IP) based communication may be used for the communication of the main terminal 520 with the auxiliary terminal 525 and encryption and integrity protection may be performed for the communication of the main terminal 520 with the auxiliary terminal 525.

In operation 553, the auxiliary terminal 525 may acquire the eUICC identification information. The auxiliary terminal 525 may read the eUICC ID (EID) from the eUICC embedded therein.

In operation 555, the auxiliary terminal 525 may be connected to the profile server 510 and may perform the authentication. The profile server 510 may be SM-DP+. The auxiliary terminal 525 uses the HTTPS protocol to perform the connection between the SM-DP+ and the TLS. At this point, the TLS authentication may be performed by the server authentication mode that authenticates only the server.

In operation 557, the auxiliary terminal 525 requests the activation code to the profile server 510. The auxiliary terminal 525 may transmit the activation code request message. The activation code request message may be ES9_ActivationCodeRequest. The activation code request message may include the activation code and the EID. The auxiliary terminal 525 may transmit the activation code request message to the SM-DP+. The auxiliary terminal 525 may request the activation code request message including the $0^{th}$ profile access key and the EID to the SM-DP+.

In operation 559, the profile server 510 may designate the profile for the eUICC of the auxiliary terminal 525 on the basis of the reception of the activation code request message and generate the access token for downloading the designated profile. The SM-DP+ may designate the profile on the basis of the received $0^{th}$ profile access key and generate the first profile access token included in the first profile access key that may download the designated profile. The first profile access token may be the EventID. The first profile access token may be security information for accessing the profile or the profile package.

In operation 561, the profile server 510 may transmit the activation code response to the auxiliary terminal 525. The activation code response may include the first profile access token. For example, the SM-DP+ may transmit the first profile access token to the auxiliary terminal 225.

In operation 563, the auxiliary terminal 225 may acquire the information of the eUICC. The auxiliary terminal 525 may confirm the ProtectedEID, the eUICC certificate and EUM certificate, and the eUICCInfo from the eUICC.

In operation 565, the auxiliary terminal 525 may transmit the event request message to the profile server 510. The event request message may include the first profile access token (EventID). The event request message may be ES9_EventRequest. The LPA of the auxiliary terminal 525 may transmit ES9_EventRequest including the first profile access token (EventID) to the SM-DP+. The event request message may include EventID, ProtectedEID, eUICC certificate, eUICCInfo, terminal information, or the like.

In operation 567, the profile server 510 verifies the eUICC. For example, the SM-DP+ verifies the eUICC. The SM-DP+ may verify the eUICC signature included in the ProtectedEID.

In operation 569, the profile server 510 may transmit the event response message to the auxiliary terminal 525. The event response message may include the verification result, the event type, and the information for profile download preparation.

In operation 571, the profile server 510 may perform additional communication with the auxiliary terminal 525 and transmit the encrypted profile package corresponding to the EventID to the auxiliary terminal 525. The auxiliary terminal 525 transmits the received profile package to the eUICC in the auxiliary terminal 525 and the eUICC installs all or a part of the encrypted profile package in the eUICC.

In operation 573, the auxiliary terminal 525 may transmit the DownloadProfileNotificationRequest to the profile server 510. For example, the auxiliary terminal 525 may transmit a notification message received from the eUICC to the SM-DP+. The download profile notification request may include information on the RemoteRequestResult and the eUICC certificate.

In operation 575, the profile server 510 may transmit the DownloadProfileNotificationResponse to the auxiliary terminal 525.

Figure 6A:
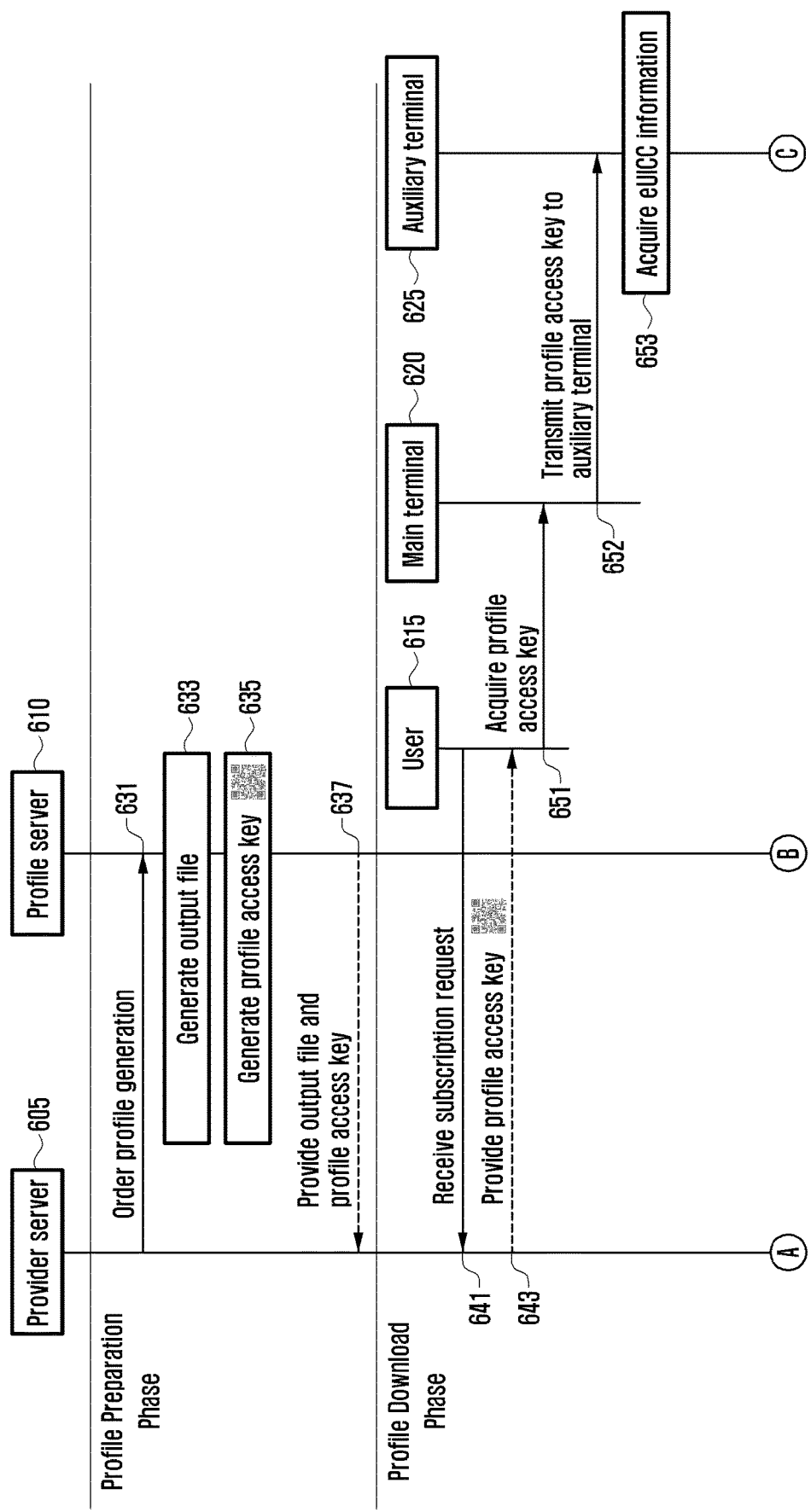
FIGS. 6A and 6B are diagrams illustrating a procedure of downloading and installing a profile for an auxiliary terminal using the first profile access key according to an embodiment of the present disclosure.
Figure 6B:
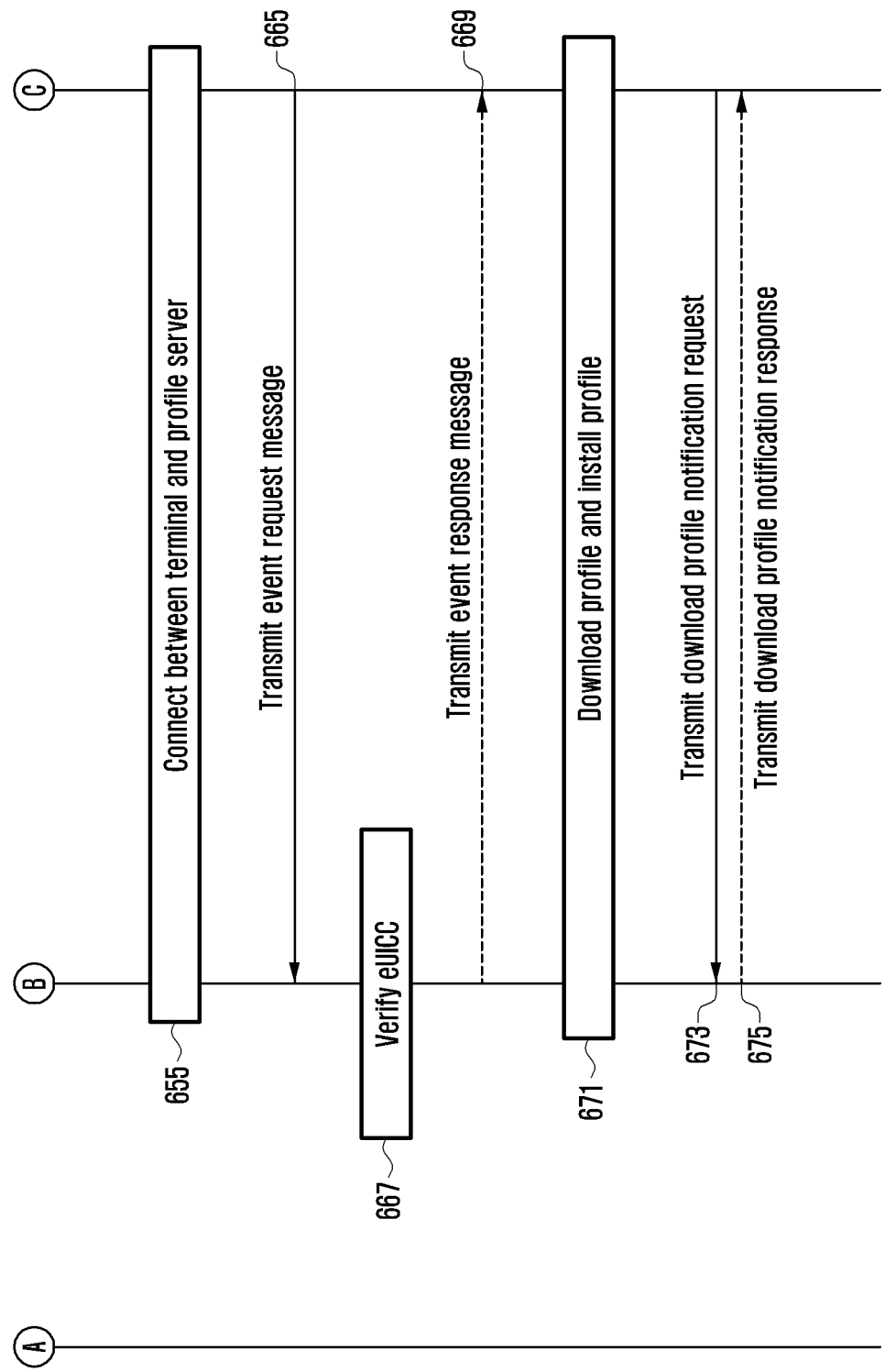

FIGS. 6A and 6B are diagrams illustrating a procedure of downloading and installing a profile for an auxiliary terminal using the first profile access key according to an embodiment of the present disclosure.

The system of FIGS. 6A and 6B may include the provider server 605, a profile server 610, a main terminal 620, and an auxiliary terminal 625. Further, the system may further include a user 615. The configuration of the provider server 605, the profile server 610, the main terminal 620, and the auxiliary terminal 625 will be described with reference to FIGS. 2A, 2B, 3A, 3B, 4A, 4B, 4C, 5A, and 5B. The configuration of the auxiliary terminal 625 will be described with reference to the description of FIGS. 5A and 5B. According to an embodiment of the present disclosure, to identify the first profile access key, the first profile access key value may be generated using a '1' value. At this point, the first profile access key includes the first profile access token. The first profile access token may be named the EventID, an activation token, or a MatchingID. If the first profile access key is input to the auxiliary terminal 625, the auxiliary terminal 625 may extract the first profile access token from the first profile access key and transmit the extracted first profile access token to the SM-DP– and may download the profile from the SM-DP+.

Hereinafter, an example of the procedure of downloading and installing a profile using the first profile access key and the first profile access token will be described with reference to FIGS. 6A and 6B.

Profile Preparation Phase

In operation 631, the provider server 605 may order the profile server 610 to generate the profile. The provider server 605 may order the generation of the plurality of profiles. The operation may be made between the provider and the SIM manufacturer.

The provider may transmit the input file including the list of IMSI values or the band information to the SIM manufacturer (EUM) to order the SIM manufacturer to generate the plurality of profiles. The process may be named the profile ordering.

In operation 633, the profile server 610 may generate the output file. The profile server 610 may generate the output file on the basis of the ordering of the profile generation. The operation 633 may be performed in the SIM manufacturer or the SIM manufacturer server. The output file may include the IMSI, ICCID, and Ki values. The SIM manufacturer may generate the output file including the IMSI, ICCID, and Ki values for N profiles. Further, the first profile access token (EventID) corresponding to an individual profile may be generated.

In operation 635, the profile server 610 may generate the first profile access key. For example, the SIM manufacturer may generate N first profile access keys. The profile access key may have a text form and may also generate the text information as the image information in the QR code form. An example of the first profile access key may be as follows. The first profile access key may be named the activation voucher. The generated text information or the image having the QR code form and the information thereon may also be named the activation voucher. First profile access token: 0123456789ABCDEFGHIJ Example of first profile access key: 1$TEST.DP.COM$0123456789ABCDEFGHIJ That is, it may consist of identifiers '1' and '$' differentiating the first profile access key, the SM-DP+ server address to be accessed, '$', and the access token value of the first profile access keys.

The first profile access token may also include the server address information. In this case, the first profile access token may be as follows in the foregoing example.

Another example of first profile access token: TEST.DP.COM$0123456789ABCDEFGHIJ

In the above example, the '$' may also use other identifiers as the identifier for identifying each information. In other words, ':' may also be used as the identifier.

In operation 637, the profile server 610 may provide the information on the output file and the profile access key (or activation voucher) to the provider server 605. For example, the SIM manufacturer provides the generated output file and N first profile access keys to the provider. At this point, the first profile access key may have the form in which it is printed on paper. The operations 631 to 337 need to be performed prior to generating any one of N profiles.

Profile Download Phase

In operation 641, the provider server 605 may receive a subscription request. The provider may receive the subscription request which may be the subscription request from the user 615. The subscription may also be performed offline at a carrier agent and may also be performed online at a carrier web portal.

In operation 643, a provider may provide one of the first profile access keys received in the operation 637 to the user. The first profile access key may be provided in the form in which it is printed on paper and may also be provided through E-mail or a web portal.

In operation 651, the main terminal 320 may acquire the first profile access key. The user 615 may input the text information on the first profile to the terminal 620 and when the first profile access key is provided as the image information such as the QR code, may scan the image information to acquire the first profile access key. For example, in the state in which the main terminal 620 and the auxiliary terminal 625 are paired, the user 615 may use the camera of the main terminal 625 to scan the QR code in which the first profile access key is carved, thereby inputting the first profile access key to the auxiliary terminal management application (for example, gear manager application) of the main terminal 620. Alternatively, the first profile access key may also be input manually. Further, if the QR code is first scanned with the main terminal 620 before the main terminal 620 is paired with the auxiliary terminal 625, the QR code may temporarily be stored to be transmitted to the auxiliary terminal 625 when being paired with the auxiliary terminal 625.

In operation 652, the main terminal 620 transmits the first profile access key to the auxiliary terminal 625. For example, the auxiliary terminal management application of the main terminal 620 transmits the first profile access key to the auxiliary terminal 625. The near field communication technologies such as WiFi, Bluetooth, and NFC or the general IP based communication or the typical IP-based communication may be used for the communication of the main terminal 620 with the auxiliary terminal 625 and the encryption and integrity protection may be performed for the communication of the main terminal with the auxiliary terminal.

In operation 653, the auxiliary terminal 625 may acquire the eUICC information. The auxiliary terminal 625 may confirm the eUICC ID (EID) from the eUICC embedded therein. Further, the auxiliary terminal 620 may confirm the ProtectedEID, the eUICC certificate and EUM certificate, and the eUICCInfo from the eUICC.

In operation 655, the auxiliary terminal 625 may be connected to the profile server 610 and may perform the authentication. The auxiliary terminal 625 uses the HTTPS protocol to perform the connection between the SM-DP+ and the TLS. At this point, the TLS authentication may be performed by the server authentication mode that authenticates only the server. In operation 665, the auxiliary terminal 625 may transmit the event request message to the profile server 610. The event request may include the first profile access token (EventID). The event request message may be ES9_EventRequest. The LPA of the auxiliary terminal 625 may transmit ES9_EventRequest including the first profile access token (EventID) to the SM-DP+. The event request message may include EventID, ProtectedEID, eUICC certificate, eUICCInfo, terminal information, or the like.

In operation 667, the profile server 610 verifies the eUICC. For example, the SM-DP+ may verify the eUICC signature included in the ProtectedEID.

In operation 669, the profile server 620 may transmit the event response message to the auxiliary terminal 625. The event response message may include the verification result, the event type, and the information for profile download preparation.

In operation 671, the profile server 610 may perform additional communication with the auxiliary terminal 625 and transmit the encrypted profile package corresponding to the EventID to the auxiliary terminal 625. The auxiliary terminal 625 transmits the received profile package to the eUICC in the auxiliary terminal 625 and the eUICC installs all or a part of the encrypted profile package in the eUICC.

In operation 673, the auxiliary terminal 625 may transmit the DownloadProfileNotificationRequest to the profile server 610. For example, the auxiliary terminal 625 may transmit a notification message received from the eUICC to the SM-DP+. The download profile notification request may include information on the RemoteRequestResult and the eUICC certificate.

In operation 675, the profile server 610 may transmit the DownloadProfileNotificationResponse to the auxiliary terminal 620.

Figure 7A:
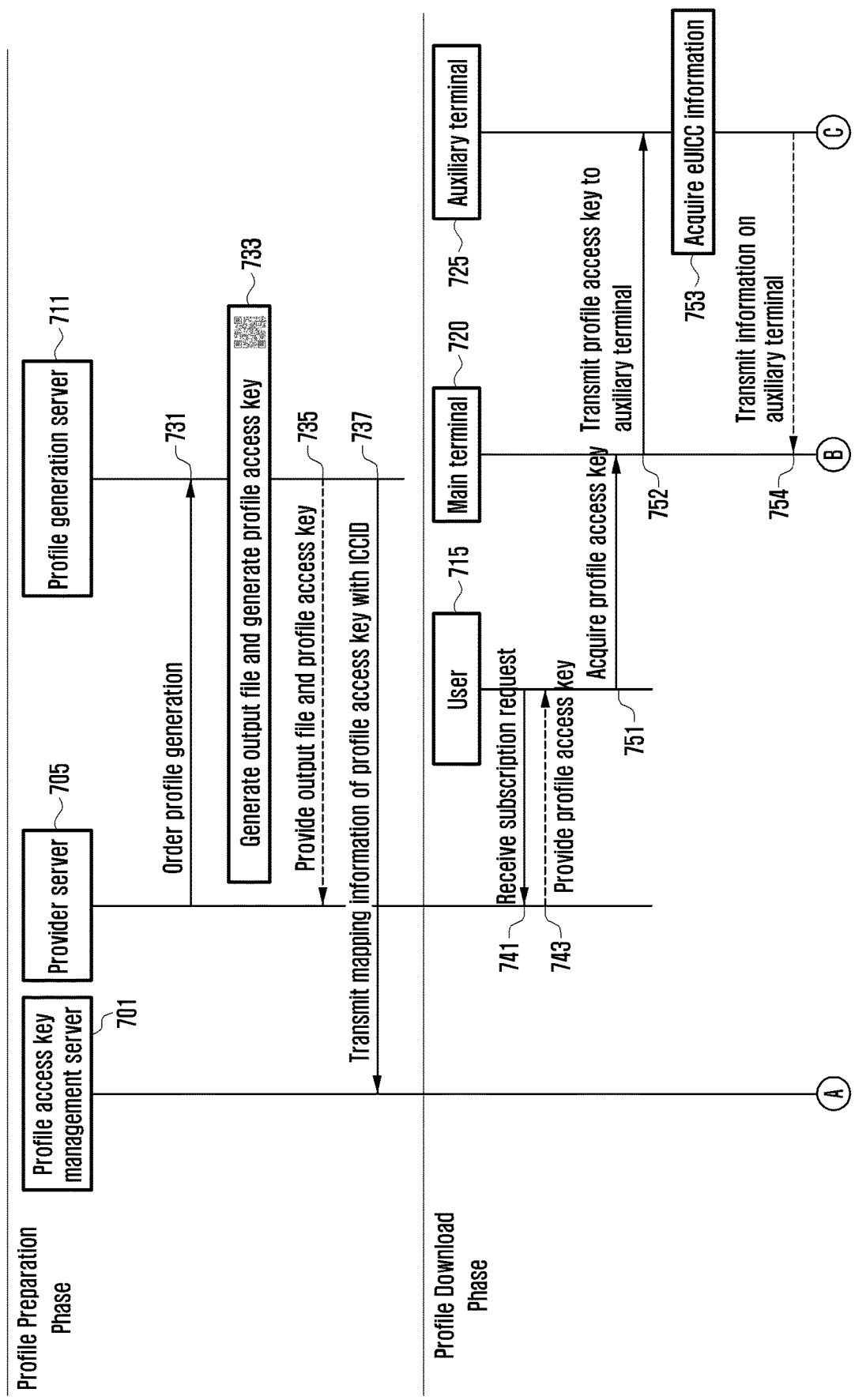
Figure 7C:
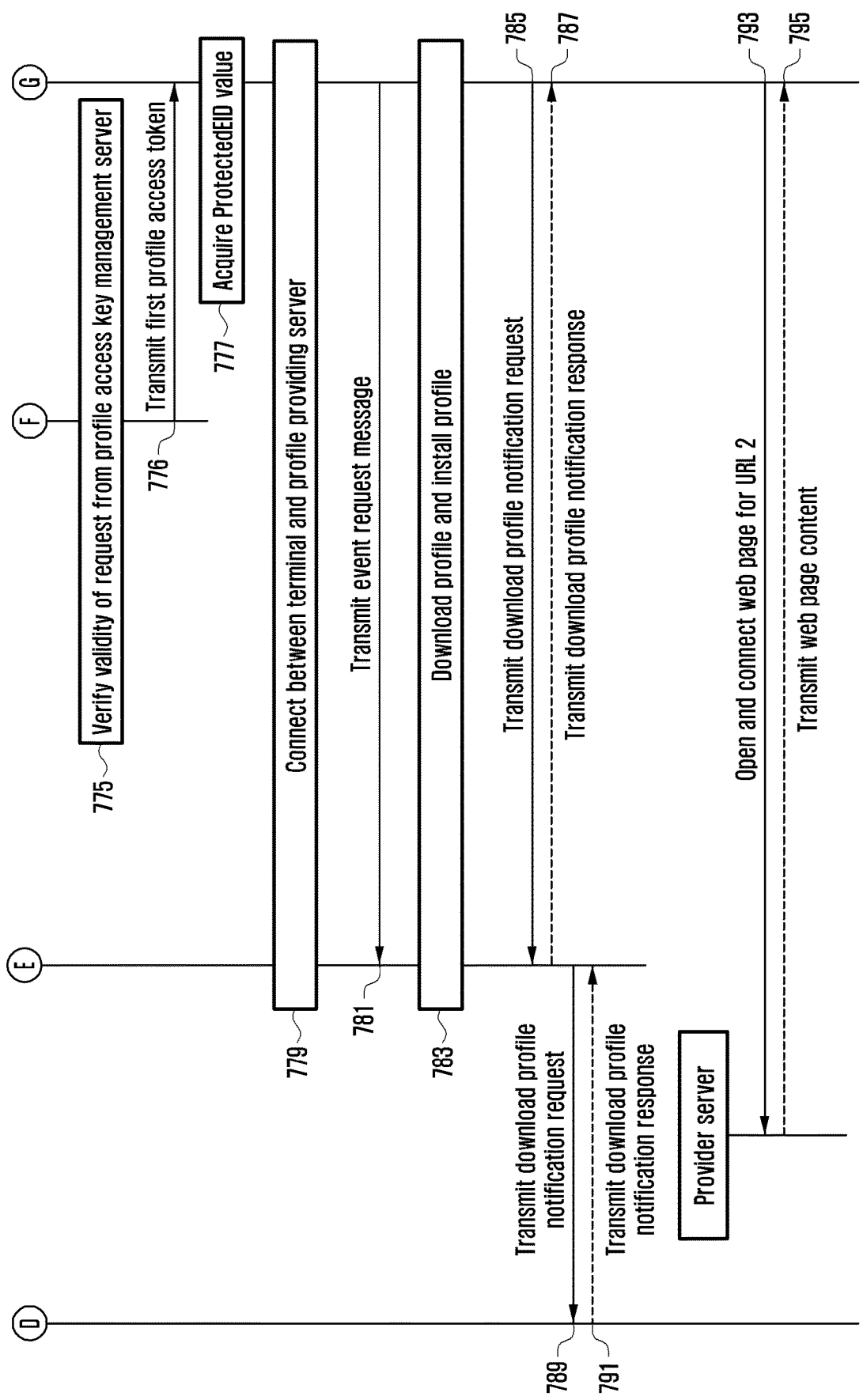

FIGS. 7A, 7B and 7C are diagrams illustrating a procedure of downloading and installing a profile for an auxiliary terminal using a second profile access key according to an embodiment of the present disclosure.

The system of FIGS. 7A, 7B and 7C may include a profile access key management server 701, a provider server 705, a profile generation server 711, a profile providing server 712, a main terminal 720, and an auxiliary terminal 725. Further, the system may further include a user 715. The profile access key management server 701 may be a server for managing the second profile access key. The configuration of the profile access key management server 701, the provider server 705, the profile generation server 711, the profile providing server 712, the main terminal 720, and the auxiliary terminal 725 will be described with reference to FIGS. 2A, 2B, 3A, 3B, 4A, 4B, 4C, 5A, 5B, 6A and 6B.

FIGS. 7A, 7B and 7C illustrate that to download the profile, if the second profile access key is provided to the profile access key management server 701, the first web screen provided from the server is displayed on the auxiliary terminal 725 and the auxiliary terminal 725 receives the first profile access key from the profile access key management server 701 after the input of the user satisfying the predetermined condition. The auxiliary terminal 725 may download the profile using the first profile access key, additionally download the profile, and then display the second web screen on the auxiliary terminal 725.

Hereinafter, an example of the procedure of downloading and installing a profile for an auxiliary terminal using the second profile access key and the second profile access token will be described with reference to FIGS. 7A, 7B and 7C.

Profile Preparation Phase

In operation 731, the provider server 405 may order the profile generation server 711 to generate the profile. The provider server 705 may order the generation of the plurality of profiles. The operation may be made between the provider and the SIM manufacturer. The provider may transmit the input file including the list of IMSI values or the band information to the SIM manufacturer (EUM) to order the SIM manufacturer to generate the plurality of profiles. The process may be named the profile ordering.

In operation 733, the profile generation server 711 may generate the output file. The profile generation server 711 may generate the output file on the basis of the ordering of the profile generation. The output file may include the IMSI, ICCID, and Ki values. The SIM manufacturer may generate the output file including the IMSI, ICCID, and Ki values for N profiles. Further, the profile generation server 711 may generate the second profile access key. For example, the SIM manufacturer may generate N second profile access keys. The second profile access key may also have the text form and may also generate the text information as the image information in the QR code form. The second profile access key may be named the activation voucher. The generated text information or the image having the QR code form and the information thereon may also be named the activation voucher.

An example of the second profile access key may be as follows.

Second profile access token: 0123456789ABCDEFGHIJ
Example of second profile access key: 2$TEST.SERVER.COM$0123456789ABCDEFGHIJ In operation 735, the profile server 711 may transmit the information on the output file and the profile access key (or activation voucher) to the provider server 705. For example, the SIM manufacturer provides the generated output file and N second profile access key to the provider. At this point, the second profile access key may have the form in which it is printed on paper.

In operation 737, the profile generation server 711 may transmit the second profile access key and the mapping information of the ICCID to the profile access key management server 701. The profile access key management server 701 may generate the second profile access key. For example, the SIM manufacturer may transmit the generated second profile access key and mapping information of the ICCID value to the profile access key management server.

The operations 731 to 737 need to be performed prior to generating any one of N profiles.

Profile Download Phase

In operation 741, the provider server 705 may receive a subscription request. The provider may receive the subscription request which may be the subscription request from the user 715. The subscription may also be performed offline at a carrier agent and may also be performed online at a carrier web portal.

In operation 743, the provider server 705 may provide one of the second profile access keys to the user 715. For example, the provider may provide one of the second profile access keys (or activation code) received in the operation 735 to the user 715. The second profile access key may be provided in the form in which it is printed on paper and may also be provided through E-mail or a web portal.

In operation 751, the main terminal 720 may acquire the second profile access key. The user 715 may input the text information on the second profile to the main terminal 720 and when the second profile access key is provided as the image information such as the QR code, may scan the image information to acquire the second profile access key. For example, in the state in which the main terminal 715 and the auxiliary terminal 720 are paired, the user 715 may use the camera of the main terminal 725 to scan the QR code in which the second profile access key is carved, thereby inputting the second profile access key to the auxiliary terminal management application (for example, gear manager application) of the main terminal 720. Alternatively, the second profile access key may also be input manually. Further, if the QR code is first scanned with the main terminal 720 before the main terminal 720 is paired with the auxiliary terminal 725, the QR code may temporarily be stored to be transmitted to the auxiliary terminal 725 when being paired with the auxiliary terminal 725.

In operation 752, the main terminal 720 transmits the second profile access key to the auxiliary terminal 725. For example, the auxiliary terminal management application of the main terminal 720 transmits the second profile access key to the auxiliary terminal 725. The near field communication technologies such as WiFi, Bluetooth, and NFC or the general IP based communication or the typical IP-based communication may be used for the communication of the main terminal 720 with the auxiliary terminal 725 and the encryption and integrity protection may be performed for the communication of the main terminal with the auxiliary terminal Further, the information on the main terminal 720 and the auxiliary terminal 725 and/or the information on the eUICC of the auxiliary terminal 725 may be requested.

In operation 753, the auxiliary terminal 725 may acquire the eUICC information. The auxiliary terminal 725 may confirm the ProtectedEID, certs_eUICC, and eUICCInfo information from the eUICC. As the EventID factor used to read the ProtectedEID, some information of the second profile download key may be reused as follows. At this point, an intermediate special character '$' may be substituted for compatibility as ':' or the like.

Second profile access key: 2$AV-SERVER.GSMA.COM$1234567890ABCDEFGHIJ

Input for ProtectedEID: AV-SERVER.GSMA.COM: 1234567890ABCDEFGHIJ

In operation 754, the auxiliary terminal 725 may provide the information on the auxiliary terminal 720 to the main terminal 720. The information on the auxiliary terminal may include the information on the eUICC and the information on the device. The information on the eUICC may include at least one of the ProtectedEID, the certs_eUICC, and the eUICCInfo and the information (model name, communication accessible technology, frequency band, or the like) on the device may include at least one of LPA contact information and LPA token. For example, the LPA of the auxiliary terminal 725 may transmit the ProtectedEID, certs_eUICC, and eUICCInfo information, the information (for example, model name, communication accessible technology, frequency band, or the like) on the device of the auxiliary terminal, the LPA contact information, and the LPA token.

In operation 755, the main terminal 725 may perform the connection with the profile access key management server 701. Since the information acquired by the main terminal 720 is the second profile access key (that is, first information of activation voucher is 2), the LPA of the main terminal 720 may first use the web view function included in the LPA and use the server address information included in the second profile access key to perform the connection of the TLS with the corresponding server. The TLS connection may be established to accept the connection in the main terminal 720 only in the case of a previously designated specific server certificate or a sub certification of a previously designated root certification. The sub certificate may be a type in which the terminal may permit the connection as long as the certificate is connected by the personal key signature in a manner in which it includes a sub certificate is signed with a personal key corresponding to a public key of the root certificate and it includes a sub certificate of the sub certificate signed with the personal key corresponding to the public key of the sub certificate.

In operation 757, the main terminal 720 may transmit the activation request message to the profile access key management server 701. The activation request message may be ES9_ActivationRequest. The auxiliary terminal management application of the main terminal 720 may the ES9_ActivationRequest message to the second profile access key management server 701. The ES9_ActivationRequest message may include at least one of the following information.

Second Profile Download Key
protectedEID
certs_eUICC
displayType

Information on display size of a main terminal (for example, information for identifying a smart phone, a tablet, and a smart watch. When the main terminal is the smart phone, the displayType value may be set to be 0)

In operation 759, the profile access key management server 701 verifies the eUICC. For example, the profile access key management server 701 verifies the eUICC signature included in the ProtectedEID. The verification may be a process of including a type using a public key of an eUICC certificate.

In operation 761, the profile access key management server 701 may transmit the activation response message to the main terminal 720. The profile access key management server 701 may use the second profile access key to provide the main terminal 720 with at least of the first URL and the second URL that the corresponding main terminal 720 and/or the auxiliary terminal 725 may access. The corresponding URL may also be changed depending on the displayType. The first URL may be the URL for the web page that guides the description of the use method of the second profile access key. Further, the second URL may be a provider web portal address. The generation of the web portal account is described and it may be the web portal address welcoming the subscription. The web portal page may be named the welcome page. The URL may be a server address that guides the web page displayed on the main terminal after the profile is installed in the auxiliary terminal well.

In operation 763, the main terminal 720 may open the web page on the basis of the first URL address. The auxiliary terminal management application of the terminal 720 may perform the TLS connection by a similar method to one described in the server of the first URL address and the operation 755. The HTTP request message used for the web server access includes at least one of the second profile access key, the ProtectedEID, the certs_eUICC, the eUICCInfo, the TerminalInfo, the LPA ContactInfo, and the LPA token. The profile access key management server 701 selects the profile corresponding to the second profile access key or the profile. Further, the SM-DP+ address may be selected. For this purpose, at least one SM-DP+ address may be established in the profile access key management server.

In operation 765, the profile access key management server 701 transmits the content of the web page corresponding to the URL1 to the main terminal 720. At this point, content may be optimized in consideration of the received displayType. The web page information may include contents such as the use method of the second profile access key, use terms, and a user agreement guidance.

In operation 767, the main terminal 720 may receive the user input corresponding to the confirmation and transmit the corresponding information to the profile access key management server 701. The user 715 may select the confirmation button as being guided to the web page to display the agreement intention to terms.

In operation 769, the profile access key management server 701 transmits the download order request message to the profile providing server 412. For example, the profile access key management server 701 may select the SM-DP+ to perform the profile download order. The profile download order is a message performing at least one of ES2+.DownloadOrder, ES2+.ConfirmOrder, ES2+.ReleaseProfile messages. The download order request message includes information on the event and the MNO ID. The event may include information on ICCID, EID, EventType, and ProfileState.

In operation 771, the profile providing server 412 may transmit the download order response message to the profile access key management server 701. The download order response message may include the EventId. In this process, the profile access key management server 410 may receive the first profile access token.

In operation 773, the profile access key management server 701 may generate information that includes the received first profile access token and the LPA token that may call the LPA of the auxiliary terminal and transmit the generated information to the main terminal 720. The information may be the Javascript information.

In operation 775, the main terminal 720 may verify whether the request from the profile access key management server 701 is an effective request. For example, the LPA of the main terminal 720 may verify the LPA token to verify whether the request from the profile access key management server 701 is an effective request. When the verification succeeds, operation 776 is performed when the verification fails, the next operation is not performed.

In operation 776, the main terminal 720 transmits the received first profile access key to the auxiliary terminal 725.

In operation 777, the auxiliary terminal 725 may acquire the ProtectedEID value. The LPA of the main terminal 720 may provide the information including the EventID to the eUICC to receive the ProtectedEID value.

In operation 779, the auxiliary terminal 725 may perform the connection with the profile providing server 712 and may perform the authentication. The profile providing server 712 may be SM-DP+. The auxiliary terminal 725 uses the HTTPS protocol to perform the connection between the SM-DP+ and the TLS. At this point, the TLS authentication may be performed by the server authentication mode that authenticates only the server.

In operation 781, the auxiliary terminal 725 may transmit the event request message to the profile providing server 712. The event request may include the first profile access token (EventID). The event request message may be ES9_EventRequest. The LPA of the auxiliary terminal 725 may transmit ES9_EventRequest including the first profile access token (EventID) to the SM-DP+.

In operation 783, the profile providing server 712 may verify the eUICC and provide the profile to the auxiliary terminal 725. For example, the SM-DP+ may verify the eUICC signature included in the ProtectedEID. The SM-DP+ may perform additional communication with the auxiliary terminal 725 and transmit the encrypted profile package corresponding to the EventID to the auxiliary terminal 725. The auxiliary terminal 725 transmits the received profile package to the eUICC in the auxiliary terminal 725 and the eUICC installs all or a part of the encrypted profile package in the eUICC.

In operation 785, the auxiliary terminal 725 may transmit the DownloadProfileNotificationRequest to the profile providing server 712. The download profile notification request may include information on the RemoteRequestResult and the eUICC certificate. In operation 787, the profile providing server 712 may transmit the DownloadProfileNotification-Response to the auxiliary terminal 725.

In operation 789, the profile providing server 712 may transmit the DownloadProfileNotificationRequest to the profile access key management server 701. In operation 791, the profile access key management server 701 may transmit the DownloadProfileNotificationResponse to the profile providing server 712.

In operation 793, the auxiliary terminal 725 may be connected with the web page for the MNO on the basis of the second URL address. The auxiliary terminal 725 may use URL2 information received in the operation 763.

In operation 795, the provider server 705 may provide the content of the web page to the auxiliary terminal 725. The web page content may include a welcome message, create an account for MNO portal, or the like.

The following configuration may be additionally applied to various respective embodiments of the present disclosure.

The user may use the activation voucher to perform the following process.

When the user uses the activation voucher to generate the failure while the profile download is performed, the user may use the same activation voucher to try the profile download again.

When the profile is installed in the eUICC of the specific terminal using the activation voucher and then the corresponding profile is deleted from the eUICC, the corresponding information notifying that the profile is deleted from the eUICC may be transmitted to the SM-DP+. The SM-DP+ may change the state of the corresponding profile to the state in which the corresponding profile may be downloaded again. Even if the profile is downloaded using the same activation voucher, the profile download may be performed by the same terminal or another terminal. The SM-DP+ may establish other policies by provider to manage whether the re-download is permitted.

To realize in detail the foregoing embodiments of the present disclosure, a detailed embodiment of application programming interface (API) will be described below. Some of the structure of the following API may be deleted and some information may be added to the structure.

1. Interface and Message Definition
1.1 Functions required for the Activation Code

| Interface | Function Caller | Function Provider | Function Name | Protocol/Data Object |
|---|---|---|---|---|
| ES9 | LPA | SM-DP+ | ES9_EventRequest<br>ES9_DownloadProfileRequest<br>ES9_DownloadProfileNotificationRequest<br>ES9_ActivationCodeRequest | HTTP/JSON |

1.2 Detailed Messages and Parameters
1.2.1 HTTP Message Format
1.2.1.1. Request

The HTTP request message shall have the following format:

```
HTTP POST <Query Path> HTTP/1.1
Host: <Server Address>
X-Admin-Protocol: samsung-gsma/1.0
Content-Type: application/json
Content-Length: <Length of the JSON body in octets>
<JSON body>
```

1.2.1.2 Response

The HTTP response message shall have the following format:

```
HTTP/1.1 200 OK
X-Admin-Protocol: samsung-gsma /1.0
Content-Type: application/json
```

-continued
```
Content-Length: <Length of the JSON body in octets>
<JSON body>
```

NOTE: Remind the blank line (i.e., CR/LF) in between the HTTP header and JSON body in both HTTP Request and Response messages.

1.2.2 ES9 APIs (LPA and SM-DP+)

1.2.2.1 ES9_EventRequest

LPA calls this function to deliver the EventID to the SM-DP+, when the Code Version is '1'.

LPA extracts the EventID by removing the prefix '1$' from the Activation Code and replacing '$' to ':' in the remaining part.

Query Path

| Query Path |
|---|
| /gsma/v4/es9/event |

JSON body schema in the request

```
{
    "type":"object",
    "properties":{
        "eventId":{"type":"string"},
        "protectedEid":{
            "type":"string",
            "format":"base64",
            "description":"The protectedEID in TLV format with Tag 0xBF79"
        },
        "certsEuicc":{
            "type":"string",
            "format":"base64",
            "description":"The certsEuicc in TLV format with Tag 0xBF68"
        },
        "terminalInfo":{
            "type":"object",
            "properties":{
                "majorSpecVersion":{"type":"integer"},
                "minorSpecVersion":{"type":"integer"},
                "imei":{"type":"string"}
            }
        },
        "euiccInfo":{
            "type":"string",
            "format":"base64",
            "description":"The euiccInfo in TLV format with Tag 0xBF65"
        }
    }
}
```

JSON body schema in the response

```
{
    "type":"object",
    "properties":{
        "result":{
            "type":"object",
            "properties":{
                "resultCode":{
                    "type":"integer"
                },
                "resultSubject":{
                    "type":"string",
                    "description":"OPTIONAL - Defines which entity raised an error in case resultCode not equal to 9xxx"
                },
                "resultInfo":{
                    "type":"string",
                    "description":"OPTIONAL - Used to provide additional information"
                }
            }
        },
        "eventType":{
            "enum":[0],
            "description":"downloadProfile (0). Other values are out of scope in this version"
        },
        "prepareDownload":{
            "type":"string",
            "format":"base64",
            "description":"The prepareDownload in TLV format with Tag 0xA4. LPA decodes it with BASE64 first and use as an input of Remote Request TLV (Tag 0xBF20) for PrepareDownload"
        }
    }
}
```

1.2.2.2. ES9_DownloadProfileRequest

LPA sends RemoteRequestResult TLV to SM-DP+.

Query Path

| Query Path |
|---|
| /gsma/v4/es9/download-profile |

JSON body schema in the request

```
{
    "type":"object",
    "properties":{
        "remoteRequestResult":{
            "type":"string",
            "format":"base64",
            "description":"The remoteRequestResult in TLV format with Tag 0xBF66"
        },
        "eventId":{"type":"string"}
    }
}
```

JSON body schema in the response

```
{
    "type":"object",
    "properties":{
        "result":{
            "type":"object",
            "properties":{
                "resultCode":{"type":"integer"},
                "resultSubject":{"type":"string",
"description":"OPTIONAL - denotes the entity that raised an error if resultCode is not 9xxx"},
                "resultInfo":{"type":"string",
"description":"OPTIONAL - provides additional information"}
            }
        },
        "profileInstallPackage":{
            "type":"array",
            "description":"array of BASE64 encoded TLVs with the following array items in order; [1] EstablishSecurityRequest (Tag 0xA5), [2] StoreProfileInfo (Tag 0x87) securing ProfileInfoPart2 (Tag 0xBF5B), [3] StoreProfileInfo (Tag 0x87) securing ProfileInfoPart3 (Tag 0xBF5C), [4] StoreProfileInfo (Tag 0x87) securing ProfileProtectionKey (Tag 0x9F7C), [5~N] SecurePackageBlock (Tag 0x86) repeats for each item",
            "items":{
```

```
        "type":"string",
        "format":"base64",
        "description":"Profile install package element"
      }
    }
  }
}
```

1.2.2.3 ES9_DownloadProfileNotificationRequest

LPA delivers the result of Profile Download and Installation to SM-DP+.

Query Path

| Query Path |
|---|
| /gsma/v4/es9/download-notification |

JSON body schema in the request

```
{
  "type":"object",
  "properties":{
    "remoteRequestResult":{
      "type":"string",
      "format":"base64",
      "description":"The remoteRequestResult in TLV format with Tag 0xBF66"
    },
    "certsEuicc":{
      "type":"string",
      "format":"base64",
      "description":"The certsEuicc in TLV format with Tag 0xBF68"
    }
  }
}
```

JSON body schema in the response

```
{
  "type":"object",
  "properties":{
    "result":{
      "type":"object",
      "properties":{
        "resultCode":{"type":"integer"},
        "resultSubject":{"type":"string"},
"description":"OPTIONAL - denotes the entity that raised an error if resultCode is not 9xxx"},
        "resultInfo":{"type":"string",
"description":"OPTIONAL - provides additional information"}
      }
    }
  }
}
```

1.2.2.4 ES9_ActivationCodeRequest

LPA sends an ActivationCode to the SM-DP+ to retrieve an EventID generated by the SM-DP+.

Query Path

| Query Path |
|---|
| /gsma/v4/es9/activation-code |

JSON body schema in the request

```
{
  "type":"object",
  "properties":{
    "activationCode":{
      "type":"string",
      "description":"whole Activation Code shall be used (i.e., this is NOT the AC_Token)"
    },
    "eId":{
      "type":"string",
      "pattern":"^[0-9,a-f,A-F]{64}$",
      "description":"32-digit decimal number."
    }
  }
}
```

JSON body schema in the response

```
{
  "type":"object",
  "properties":{
    "result":{
      "type":"object",
      "properties":{
        "resultCode":{"type":"integer"},
        "resultSubject":{"type":"string",
"description":"OPTIONAL - denotes the entity that raised an error if resultCode is not 9xxx"},
        "resultInfo":{"type":"string",
"description":"OPTIONAL - provides additional information"}
      }
    },
    "eventId":{"type":"string"}
  }
}
```

The detailed embodiment of the profile access key (activation code) for implementing in detail the foregoing embodiments may be as follows. The following embodiment is only an example of the profile access key and therefore the configuration of the profile access key is not limited thereto.

The Activation Code SHALL be coded to be the concatenation of the following strings listed in the following table:

| Name | MOC | Description |
|---|---|---|
| Code Version | M | Version of the Activation Code. SHALL be set to '1' for this version of the Activation Code |
| Delimiter | M | SHALL be set to '$' |
| SM-DP+ Address | M | FQDN (Fully Qualified Domain Name) of the SM-DP+ (e.g., smdp.gsma.com) |
| Delimiter | M | SHALL be set to '$' |
| AC_Token | M | MatchingID as described in section 8.5 |
| Delimiter | C | SHALL be present and set to '$' if any of the following optional parameters is present. |
| SMDPid | O | Subject Identifier of the SM-DP+ certificate |
| Delimiter | C | SHALL be present and set to '$' if any of the following optional parameters is present. |
| Confirmation Code Required Flag | O | SHALL present be and set to '1' if Confirmation Code is required; else it SHALL be absent. |

Examples of the Activation Code are as follows:

1$smdp.gsma.com$043867483815790 (if SMDPid and Confirmation Code required flag are not present)

1$smdp.gsma.com$043867483815790$$1 (if SMDPid is not present and Confirmation Code required flag is present)

1$smdp.gsma.com$043867483815790$1.3.6.1.4.1.31746$1 (if SMDPid and Confirmation Code required flag are present)

1$smdp.gsma.com$043867483815790$1.3.6.1.4.1.31746 (if SMDPid is present and Confirmation Code required flag is not present)

According to an embodiment of the present disclosure, 0, 1, or 2 values may be applied to a code version field to identify the $0^{th}$ profile access key, the first profile access key, and the second profile access key. Further, the SM-DP+ address field may be connected to the terminal to provide the profile server address that downloads the profile package. The AC_Token field may be information on authority for downloading the event ID or the profile or security information.

Figure 8:
FIG. 8 is a diagram illustrating a type of profile access key according to an embodiment of the present disclosure.

FIG. 8 is a diagram illustrating a detailed example of a QR code according to an embodiment of the present disclosure.

Referring to FIG. 8, for the QR code representation, the profile access key may use alphanumeric encoding. An appropriate level of error connection is provided to the QR code by using a level M error connection. To more quickly perform the recognition at the time of the QR code scanning, a minimum version that may include the profile access key information may be used to maximize a grid size of the QR code.

For example, when the profile access key consisting of 46 letters uses the level M error connection, the QR code version in which a maximum text length is 47 letters is preferably used as 2.

As another example, the profile access keys like the text type of FIG. 8 may be represented as a QR code image of FIG. 8

Figure 9:
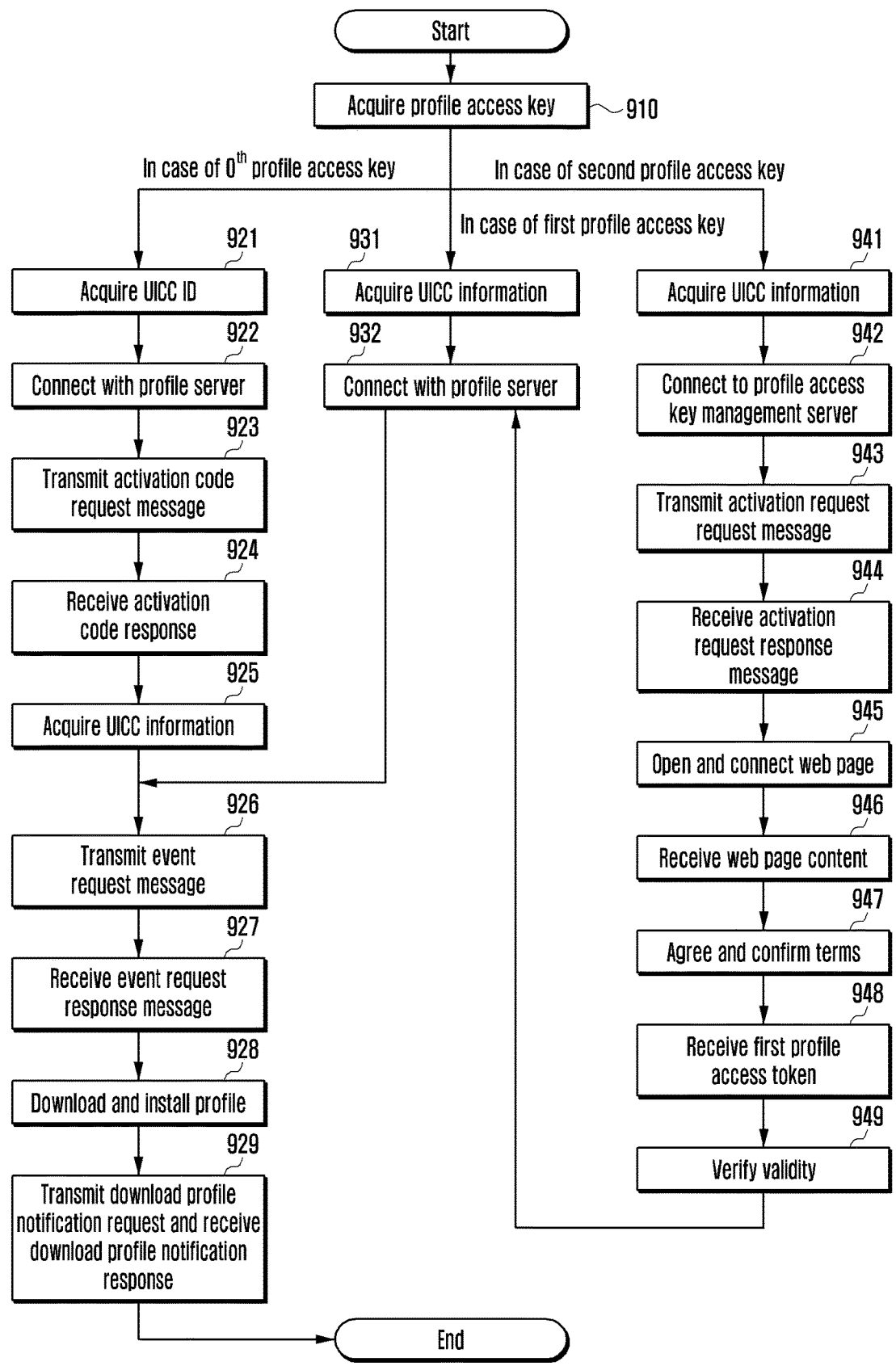
FIG. 9 is a diagram illustrating an operation of a terminal according to an embodiment of the present disclosure.

FIG. 9 is a diagram illustrating an operation of a terminal according to an embodiment of the present disclosure.

Referring to FIG. 9, in operation 910, the terminal may receive the profile access key (activation code). The profile access key may be directly input to the terminal by the user and may also be extracted from the image information acquired from image devices of the camera, or the like.

The operation of the terminal may be determined depending on the profile access key received by the terminal. If the profile access key received by the terminal is the $0^{th}$ profile access key, the operation may proceed to operation 921, if the profile access key received by the terminal is the first profile access key, the operation may proceed to operation 931, and if the profile access key received by the terminal is the second profile access key, the operation may proceed to operation 941.

Operation 921 and the following operations refer to the operations of the terminal in FIGS. 2A and 2B.

In the operation 921, the terminal may confirm the information on the UICC. The terminal may confirm the information on the UICC on the basis of the reception of the profile access key. Further, the terminal may confirm the information on the UICC in advance and the may also use the information on the previously acquired UICC at the time of the reception of the profile access key.

In the operation 922, the terminal may perform the connection with the profile server.

In operation 923, the terminal 923 may transmit the activation code request message to the profile server. The activation code request message may include the activation code and the EID.

In operation 924, the terminal 923 may receive the activation code response message from the profile server. The activation code response message may include the first profile access token.

In the operation 925, the terminal 220 may acquire the UICC information. The UICC information may be acquired in advance. The terminal may acquire the ProtectedEID, the eUICC certificate and EUM certificate, and the eUICCInfo from the eUICC.

In operation 926, the terminal transmits the event request message to the profile server. The event request message may include the first profile access token.

In operation 927, the terminal may receive the event request response message from the profile server. The event request response message may include the verification result, the event type, and the information for profile download preparation.

In operation 928, the terminal may download the profile from the profile server and install the profile in the UICC of the terminal.

In operation 929, the terminal may transmit the download profile notification request to the profile server and receive the download profile notification response from the profile server.

In the operation 910, when the profile access key received by the terminal is the first profile access key, the operation proceeds to operation 931. In the operation 931, the terminal may confirm the information on the UICC. The terminal may acquire the ProtectedEID, the eUICC certificate and EUM certificate, and the eUICCInfo from the eUICC.

In the operation 932, the terminal may perform the connection with the profile server. In the operation 932, the connection is performed and then the terminal proceeds to the operation 926, thereby performing the operations described above.

In the operation 910, when the profile access key received by the terminal is the second profile access key, the operation proceeds to operation 941. In the operation 941, the terminal 220 may acquire the UICC information. The terminal may confirm the ProtectedEID, certs_eUICC, and eUICCInfo information from the eUICC.

In operation 942, the terminal performs the connection with the profile access key management server.

In operation 943, the terminal may transmit the activation request message to the profile access key management server. The activation request message may include the information on the second profile download key, the protectedEID, the certs_eUICC, and the displayType.

In operation 944, the terminal may receive the activation request response message from the profile access key management server. The activation request response message may include at least one of the information on the first URL and the second URL. The first URL may be an URL for a web page that guides the description of the use method of the second profile access key. Further, the second URL may be a provider web portal address.

In operation 945, the terminal may use the information on the first URL of the received activation request response message to open the web page and may be connected to the server. The server may be the profile access key management server.

In operation 946, the terminal may receive the content of the web page corresponding to the first URL from the profile access key management server.

In operation 947, the terminal may use the information on the use method, the use terms, the user consent guidance, or the like to receive the agreement to terms or the confirmation of agreement and transmit the information corresponding thereto to the profile server.

In operation 948, the terminal may receive the information including the first profile access token and/or the LPA token that may call the LPA of the terminal from the profile access key management server. The information may be the Javascript information.

In operation 949, the terminal may verify whether the request from the profile access key management server is an effective request. When the request from the profile access key management server is not an effective request, the following operation is not performed. When the request from the profile access key management server is an effective request, the terminal proceeds to the operation 932 to perform operations following the operation 932.

The terminal may perform different operations depending on the received profile access key by the foregoing method.

The operation of the terminal mentioned in FIG. 9 may be applied to the auxiliary terminal. In the case of the auxiliary terminal, the auxiliary terminal may acquire the information on the profile access key from the main terminal and may perform the operations 921 and 931. In an embodiment of the present disclosure in which the second profile access key is applied, the operations 941 to 949 may be performed in the main terminal and the auxiliary terminal may be performed from the operation 932 after the operation 949.

Meanwhile, the operations of the terminal and the auxiliary terminal are not limited to the embodiment of FIG. 9 and therefore it is to be understood that the operations of the terminal and the auxiliary terminal described with reference to FIGS. 2A, 2B, 3A, 3B, 4A, 4B, 4C, 5A, 5B, 6A, 6B, 7A, 7B, 7C and 8 may be included.

Figure 10:
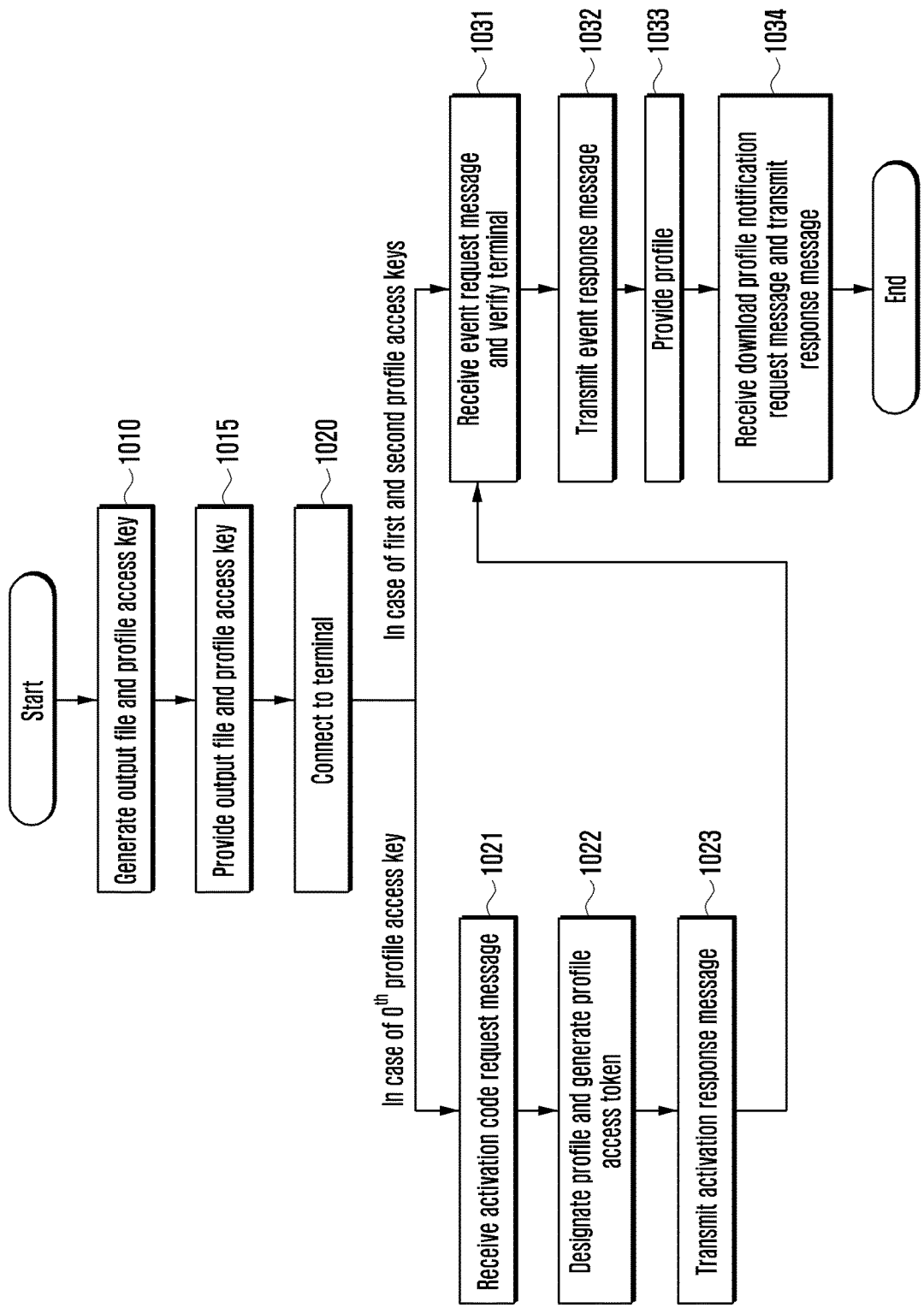
FIG. 10 is a diagram illustrating an operation of a profile server according to an embodiment of the present disclosure.

FIG. 10 is a diagram illustrating an operation of a profile server according to an embodiment of the present disclosure.

Referring to FIG. 10, in operation 1010, the profile server may generate the output file and the profile access key. The profile server may receive the profile generation order from the provider server and generate the output file and the profile access key. The profile access key may be at least one of the $0^{th}$ profile access key, the first profile access key, and the second profile access key and may generate the plurality of profile access keys.

In operation 1015, the profile server may provide the output file and the profile access key to the provider server. The profile access key may be named the activation voucher. When the profile access key is the second profile access key, the profile server may additionally transmit the mapping information of the profile access key with the ICCID to the profile access key management server.

In operation 1020, the profile server may be connected to the terminal. The TLS connection with the terminal may be made and the security procedure may be performed.

When the terminal connected to the profile server transmits the activation code request message on the basis of the $0^{th}$ profile access key, the operation proceeds to operation 1021.

In the operation 1021, the profile server may receive the activation code request message. The activation code request message may include the activation code ($0^{th}$ profile access key) and the EID.

In operation 1022, the profile server may designate the profile for the UICC of the terminal on the basis of the reception of the activation code request message and generate the profile access token for downloading the designated profile. The token may be the first profile access token.

In operation 1023, the profile server may transmit the activation code response message to the terminal. The activation code response message may include the first profile access token.

In operation 1031, the profile server may receive the event request message and verify the terminal on the basis of the received event request message. The UICC of the terminal may be verified. The event request may include the first profile access token (EventID).

In operation 1032, the profile server transmits the event response message to the terminal. The event response message may include the verification result, the event type, and the information for profile download preparation.

In operation 1033, the profile server may provide the profile to the terminal. The profile may be downloaded and installed in the eUICC of the terminal.

In operation 1034, the profile server may receive the profile notification request message from the terminal and transmit the download profile notification response message.

When the terminal connected to the profile server transmits the event request message on the basis of the first profile access key, the operation proceeds to operation 1031. The operations following the operation 1031 are the same goes for the foregoing description.

When the terminal receiving the first profile access key from the profile access key management server using the second profile access key is connected to the profile server and transmits the activation code request message on the basis of the first profile access key, the operation proceeds to the operation 1031. The operations following the operation 1031 are the same goes for the foregoing description.

Meanwhile, the operation of the profile server is not limited to the embodiment of FIG. 10 and therefore it is to be understood that all the operations of the profile server described with reference to FIGS. 2A, 2B, 3A, 3B, 4A, 4B, 4C, 5A, 5B, 6A, 6B, 7A, 7B, 7C and 8 may be included. Further, the profile server may be divided into the profile generation server and the profile providing server and some of the operations may be performed in the profile generation server and some of the operations may be performed in the profile providing server. The embodiment of FIGS. 2A, 2B and 8 will be referenced while the profile generation server and the profile providing server may be divided.

Figure 11:
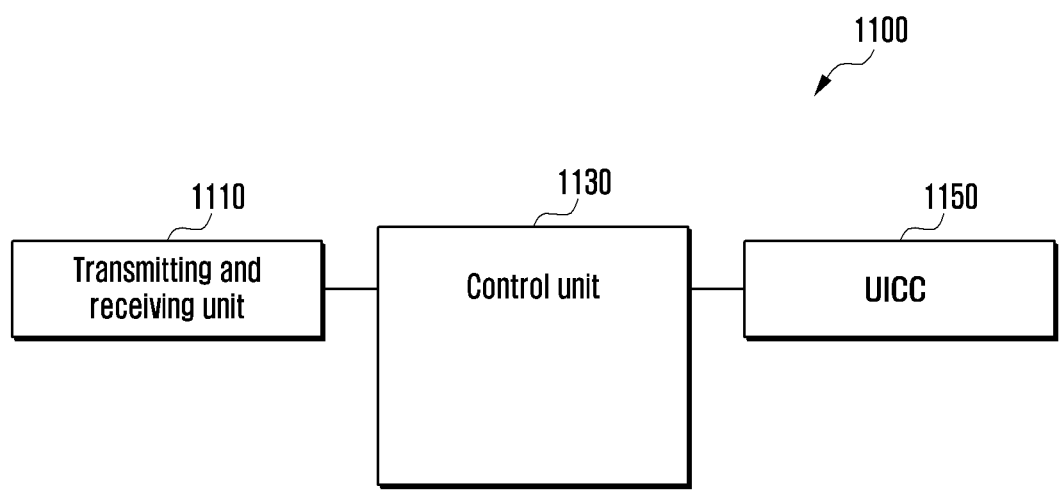
FIG. 11 is a diagram illustrating a terminal according to an embodiment of the present disclosure.

FIG. 11 is a diagram illustrating a terminal illustrating according to an embodiment of the present disclosure.

Referring to FIG. 11, the terminal 1100 may include a transceiver or transmitting and receiving unit 1110 and a controller or control unit 1130 (at least one processor). The terminal 1100 may include UICC 1150. The UICC 1150 may be inserted into the terminal 1100 and may be the eUICC embedded in the terminal 1100. The controller 1130 may be a circuit, an application-specific integrated circuit or at least one processor.

The transceiver 1100 may transmit and receive a signal, information, data, or the like. The controller 1130 may control the overall operation of the terminal 1100. The controller 1130 may control the overall operation of the terminal 1100 described with reference to FIGS. 2A, 2B, 3A, 3B, 4A, 4B, 4C, 5A, 5B, 6A, 6B, 7A, 7B, 7C, 8 and 9. The UICC 1150 may download the profile and the install the profile. Further, the UICC may manage the profile. The UICC 1150 may also be operated according to the control of the controller 1130. The structure of the terminal may be applied to both of the main terminal and the auxiliary terminal.

According to an embodiment of the present disclosure, the controller 1130 may perform a control to acquire the information including the access token for transmitting the profile request to the profile server, transmit a first message including the universal integrated circuit card (UICC) information of the terminal to the profile server, receive a second message including the verification result from the profile server, and receive the profile package corresponding to the access token from the profile server. The information may include the identifier for identifying characteristics of information, the profile server address, and the access token.

Further, the controller 1130 may perform a control to designate the profile package corresponding to the access token and the UICC information and receive the designated profile package. The profile package is designated in the profile server.

Further, the controller 1130 may perform a control to scan the activation voucher with the image acquisition device of the terminal to acquire the information including the access token. The controller 1130 may perform a control to be connected to the profile server on the basis of the address and transmit the message determined on the identifier to the profile server.

According to an embodiment of the present disclosure, the configurations of the terminal 1100 and the controller 1130 are not limited thereto and may perform an operation or a control to perform the operation of the terminal described with reference to FIGS. 2A, 2B, 3A, 3B, 4A, 4B, 4C, 5A, 5B, 6A, 6B, 7A, 7B, 7C, 8 and 9.

Figure 12:
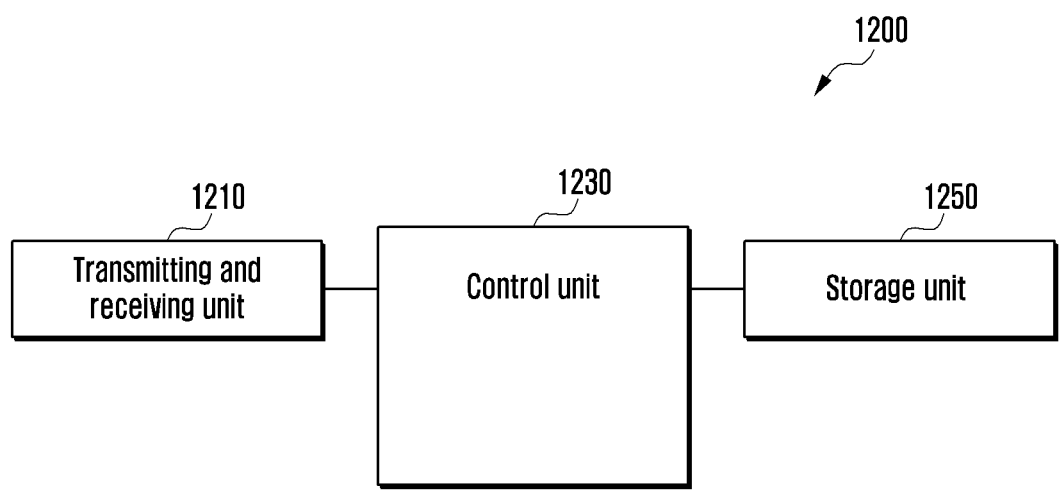
FIG. 12 is a diagram illustrating a profile server according to an embodiment of the present disclosure.

FIG. 12 is a diagram illustrating a profile server according to an embodiment of the present disclosure.

Referring to FIG. 12, the profile server 1200 may include a transceiver or transmitting and receiving unit 1210 and a controller or control unit 1230 (at least one processor). The profile server may further include a memory or storage unit 1250. The storage unit may store the profile, the information on the profile, and the information on the profile access key. The storage unit may include at least one memory. The transceiver 1210 may transmit and receive a signal, information, data, or the like. The controller 1230 controls the overall operation of the profile server 1200. The controller 1230 may control the overall operation of the profile server 1200 described with reference to FIGS. 2A, 2B, 3A, 3B, 4A, 4B, 4C, 5A, 5B, 6A, 6B, 7A, 7B, 7C, 8 and 9. Further, the profile server may be divided into the profile generation server and the profile providing server and some of the operations may be performed in the profile generation server and some of the operations may be performed in the profile providing server. The controller 1230 may be a circuit, an application-specific integrated circuit or at least one processor.

According to an embodiment of the present disclosure, the controller 1230 may perform a control to receive the first message including the access token and the UICC information of the terminal from the terminal, verify the terminal on the basis of the UICC information of the first message, transmit the second message including the verification result to the terminal, and transmit the profile package corresponding to the access token to the terminal. The information may include the identifier for identifying the characteristics of information, the profile server address, and the access token.

Further, the controller 1230 may perform a control to designate the profile package corresponding to the access token and the UICC information.

Further, the controller 1230 may perform a control to generate the activation voucher and provide the activation voucher to the provider server. The terminal may acquire the information on the activation voucher from the provider server.

According to an embodiment of the present disclosure, the configurations of the terminal 1200 and the controller 1230 are not limited thereto and may perform an operation or a control to perform the operation of the server described with reference to FIGS. 2A, 2B, 3A, 3B, 4A, 4B 4C, 5A, 5B, 6A, 6B, 7A, 7B, 7C, 8 and 10.

Figure 13:
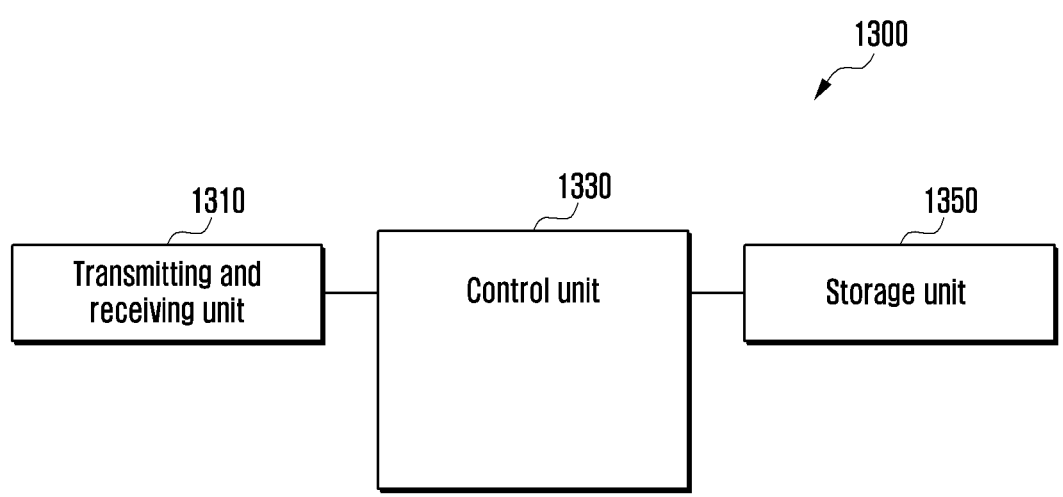
FIG. 13 is a diagram illustrating a provider server according to an embodiment of the present disclosure.

FIG. 13 is a diagram illustrating a provider server according to an embodiment of the present disclosure.

Referring to FIG. 13, the provider server 1300 may include a transceiver or transmitting and receiving unit 1310 and a controller or control unit 1330 (at least one processor). The provider server may further include a memory or storage unit 1350. The storage unit 1350 may store subscriber information and may also store the information on the profile access key received from the profile server. The transceiver 1310 may transmit and receive a signal, information, data, or the like. The controller 1330 controls the overall operation of the provider server 1300. The controller 1330 may control the overall operation of the provider server 1300 described with reference to FIGS. 2A, 2B, 3A, 3B, 4A, 4B, 4C, 5A, 5B, 6A, 6B, 7A, 7B and 7C. The controller 1330 may be a circuit, an application-specific integrated circuit or at least one processor.

According to an embodiment of the present disclosure, the configurations of the provider server 1300 and the controller 1330 are not limited thereto and may perform an operation or a control to perform the operation of the provider server described with reference to FIGS. 2A, 2B, 3A, 3B, 4A, 4B, 4C, 5A, 5B, 6A, 6B, 7A, 7B and 7C.

Figure 14:
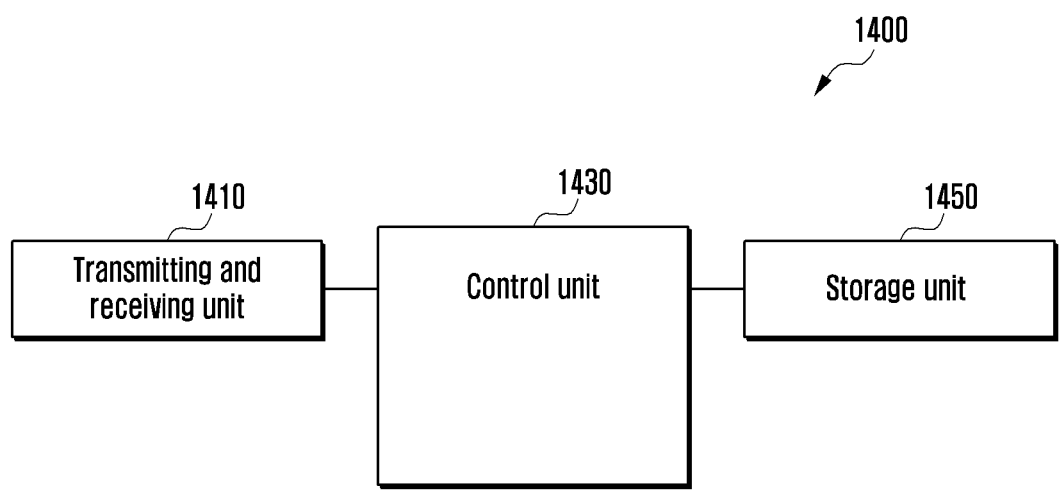
FIG. 14 is a diagram illustrating a profile access key management server according to an embodiment of the present disclosure.

FIG. 14 is a diagram illustrating a profile access server management server according to an embodiment of the present disclosure.

Referring to FIG. 14, the profile access key management server 1400 may include a transceiver or transmitting and receiving unit 1410 and a controller or control unit 1430 (at least one processor). The profile access key management server may further include a memory or storage unit 1450. The storage 1450 may store the information on the profile access key. The transceiver 1410 may transmit and receive a signal, information, data, or the like. The controller 1430 may control the overall operation of the profile access key management server 1400. The controller 1430 may control the overall operation of the profile access key management server 1400 described with reference to FIGS. 4A, 4B, 4C, 7A, 7B and 7C. The controller 1430 may be a circuit, an application-specific integrated circuit or at least one processor.

According to an embodiment of the present disclosure, the configurations of the profile access key management server 1400 and the controller 1430 are not limited thereto and may perform an operation or a control to perform the operation of the profile server described with reference to FIGS. 4A, 4B, 4C, 7A, 7B and 7C.

In the detailed embodiments of the present disclosure, components included in the present disclosure are represented by a singular number or a plural number according to the detailed embodiment as described above. However, the expressions of the singular number or the plural number are selected to meet the situations proposed for convenience of explanation and the present disclosure is not limited to the single component or the plural components and even though the components are represented in plural, the component may be configured in a singular number or even though the components are represented in a singular number, the component may be configured in plural.

In accordance with various embodiments of the present disclosure, the method and apparatus for downloading a profile may be provided. In accordance with various embodiments of the present disclosure, the method and apparatus for downloading a profile using a profile access key may be provided.

Further, in accordance with various embodiments of the present disclosure, the method and apparatus for downloading, by an auxiliary terminal, a profile using the main terminal and the profile access key may be provided.

Further, in accordance with various embodiments of the present disclosure, a new type of profile access key may be provided and the method and apparatus for downloading a profile using the new type of profile access key may be provided.

While the present disclosure has been shown and described with reference to various embodiments thereof, it will be understood by those skilled in the art that various changes in form and details may be made therein without departing from the scope and spirit of the present disclosure as defined by the appended claims and their equivalents.

What is claimed is:

1. A method performed by an operator server for providing a profile to a terminal, the method comprising:
    transmitting, to a profile server, a profile order to generate the profile;
    receiving, from the profile server, a matching identifier (ID) in response to the profile order; and
    providing the matching ID to a main terminal,
    wherein the profile server is to provide the profile to an auxiliary terminal based on the matching ID provided to the main terminal.

2. The method of claim 1, further comprising:
    receiving, from the profile server, an integrated circuit card ID (ICCID) identifying the profile.

3. The method of claim 1, wherein the auxiliary terminal includes a local profile assistant (LPA) and an embedded universal integrated circuit card (eUICC).

4. The method of claim 1, wherein the matching ID is provided in form of text information or image information.

5. The method of claim 1, wherein the auxiliary terminal is paired with the first main terminal by a secured communication technology.

6. A method performed by a first main terminal for providing a profile to an auxiliary terminal, the method comprising:
    obtaining a matching identifier (ID) from an operator server; and
    transmitting, to the auxiliary terminal, the matching ID,
    wherein the matching ID is generated by a profile server in response to a profile order from the operator server to generate the profile, and
    wherein the profile server is to provide the profile to the auxiliary terminal based on the matching ID.

7. The method of claim 6, wherein the matching ID and an integrated circuit card ID (ICCID) identifying the profile are transmitted from the profile server to the operator server.

8. The method of claim 6, wherein the auxiliary terminal includes a local profile assistant (LPA) and an embedded universal integrated circuit card (eUICC).

9. The method of claim 6, wherein the matching ID includes text information or image information, and the obtaining of the matching ID comprises identifying the text information or scanning the imaging information.

10. The method of claim 6, wherein the first main terminal is paired with the auxiliary terminal by a secured communication technology.

11. An operator server comprising:
    a transceiver; and
    a controller coupled with the transceiver and configured to:
        transmit, to a profile server via the transceiver, a profile order to generate a profile,
        receive, from the profile server via the transceiver, a matching identifier (ID) in response to the profile order, and
        providing the matching ID to a main terminal,
    wherein the profile server is to provide the profile to an auxiliary terminal based on the matching ID provided to the main terminal.

12. The operator server of claim 11, wherein the controller is further configured to receive, from the profile server via the transceiver, an integrated circuit card ID (ICCID) identifying the profile.

13. The operator server of claim 11, wherein the auxiliary terminal includes a local profile assistant (LPA) and an embedded universal integrated circuit card (eUICC).

14. The operator server of claim 11, wherein the matching ID is provided in form of text information or image information.

15. The operator server of claim 11, wherein the auxiliary terminal is paired with the main terminal by a secured communication technology.

16. A main terminal comprising:
    a transceiver; and
    a controller coupled with the transceiver and configured to:
        obtain a matching identifier (ID) from an operator server, and
        transmit, to an auxiliary terminal via the transceiver, the matching ID,
    wherein the matching ID is generated by a profile server in response to a profile order from the operator server to generate a profile, and
    wherein the profile server is to provide the profile to the auxiliary terminal based on the matching ID.

17. The main terminal of claim 16, wherein the matching ID and an integrated circuit card ID (ICCID) identifying the profile are transmitted from the profile server to the operator server.

18. The main terminal of claim 16, wherein the auxiliary terminal includes a local profile assistant (LPA) and an embedded universal integrated circuit card (eUICC).

19. The main terminal of claim 16,
    wherein the matching ID includes text information or image information, and
    wherein the controller is further configured to obtain the matching ID by identifying the text information or scanning the imaging information.

20. The main terminal of claim 16, wherein the main terminal is paired with the auxiliary terminal by a secured communication technology.

* * * * *